US012770641B2

(12) United States Patent
Matsubara et al.

(10) Patent No.: US 12,770,641 B2
(45) Date of Patent: Oct. 20, 2026

(54) INFORMATION PROCESSING APPARATUS, INFORMATION INPUT SUPPORT SYSTEM, AND NON-TRANSITORY RECORDING MEDIUM

(71) Applicants: Mayumi Matsubara, Tokyo (JP); Masaki Nose, Kanagawa (JP)

(72) Inventors: Mayumi Matsubara, Tokyo (JP); Masaki Nose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 345 days.

(21) Appl. No.: 18/502,358

(22) Filed: Nov. 6, 2023

(65) Prior Publication Data

US 2024/0153529 A1 May 9, 2024

(30) Foreign Application Priority Data

Nov. 8, 2022 (JP) ................................ 2022-178930
Sep. 11, 2023 (JP) ................................ 2023-147027

(51) Int. Cl.
*G10L 25/72* (2013.01)
*G10L 15/06* (2013.01)
*G10L 15/18* (2013.01)

(52) U.S. Cl.
CPC ............ *G10L 25/72* (2013.01); *G10L 15/063* (2013.01); *G10L 15/18* (2013.01)

(58) Field of Classification Search
CPC ....... G10L 25/72; G10L 15/063; G10L 15/18; G06Q 10/10; G06Q 30/01; H04L 51/02; G06F 3/167
See application file for complete search history.

(56) References Cited

U.S. PATENT DOCUMENTS

| | | | | |
|---|---|---|---|---|
| 7,519,566 B2 * | 4/2009 | Prigogin | ................ | G06Q 10/06 707/999.1 |
| 8,265,261 B1 * | 9/2012 | Adamson | ............ | H04M 3/5166 379/88.2 |
| 11,283,928 B1 * | 3/2022 | Edwards | ................. | G10L 15/08 |
| 11,563,852 B1 * | 1/2023 | Can | ..................... | H04M 3/5175 |
| 2009/0192838 A1 * | 7/2009 | Bangalore | ...... | G06Q 10/063112 705/7.13 |
| 2010/0017263 A1 * | 1/2010 | Zernik | ................ | H04M 3/5175 705/14.43 |

(Continued)

FOREIGN PATENT DOCUMENTS

| | | |
|---|---|---|
| JP | 2019-185161 A | 10/2019 |
| JP | 2021-128597 A | 9/2021 |
| JP | 2022-112541 A | 8/2022 |

*Primary Examiner* — Fariba Sirjani
(74) *Attorney, Agent, or Firm* — IPUSA, PLLC

(57) ABSTRACT

An information input support system includes a communication terminal operated by an operator and an information processing apparatus communicable with the communication terminal. The information processing apparatus includes circuitry to acquire information on the operator and activity information that includes information on an activity of the operator for a customer through a dialogue with the operator, determine needs of the customer based on the activity information, and transmit speech information to the communication terminal. The speech information includes the needs of the customer for display to the operator. The communication terminal includes another circuitry to output the speech information.

11 Claims, 17 Drawing Sheets

(56) References Cited

U.S. PATENT DOCUMENTS

| | | | | |
|---|---|---|---|---|
| 2014/0019199 | A1* | 1/2014 | Appel | G06Q 30/00<br>705/7.29 |
| 2014/0067375 | A1* | 3/2014 | Wooters | G06F 40/35<br>704/9 |
| 2018/0165723 | A1* | 6/2018 | Wright | G06F 40/30 |
| 2019/0253558 | A1* | 8/2019 | Haukioja | G10L 15/22 |
| 2019/0355043 | A1* | 11/2019 | Swierk | G10L 15/22 |
| 2020/0007380 | A1* | 1/2020 | Chen | G06N 3/09 |
| 2020/0013068 | A1* | 1/2020 | Pony | G06Q 10/06393 |
| 2020/0117710 | A1* | 4/2020 | Okura | G06N 3/0499 |
| 2020/0327892 | A1* | 10/2020 | Fox | H04M 3/5191 |
| 2022/0237385 | A1 | 7/2022 | Kawamura et al. | |
| 2022/0270017 | A1* | 8/2022 | Singh | G10L 21/0208 |
| 2022/0277282 | A1* | 9/2022 | Dorch | G06Q 30/0631 |
| 2024/0073321 | A1* | 2/2024 | Can | G10L 15/26 |
| 2024/0153529 | A1* | 5/2024 | Matsubara | G06Q 10/10 |
| 2024/0161123 | A1* | 5/2024 | Cardona De Leon | G06F 40/30 |

* cited by examiner

INFORMATION PROCESSING APPARATUS, INFORMATION INPUT SUPPORT SYSTEM, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-178930, filed on Nov. 8, 2022 and 2023-147027, filed on Sep. 11, 2023, in the Japan Patent Office, the entire disclosure of which is hereby incorporated by reference herein.

BACKGROUND

Technical Field

Embodiments of the present disclosure relate to an information processing apparatus, an information input support system, and a non-transitory recording medium.

Related Art

As known in the art, there is a technique of a dialogue system such as a chatbot that supports information input for operators engaged in tasks that require information input. For example, technologies have been proposed that manage an action record and an activity schedule of an operator, transmit a message prompting the operator to input a report, and determine the activity schedule of the operator based on the input report.

SUMMARY

In one aspect, an information input support system includes a communication terminal operated by an operator and an information processing apparatus communicable with the communication terminal. The information processing apparatus includes circuitry to acquire information on the operator and activity information that includes information on an activity of the operator for a customer through a dialogue with the operator, determine needs of the customer based on the activity information, and transmit speech information to the communication terminal. The speech information includes the needs of the customer for display to the operator. The communication terminal includes another circuitry to output the speech information.

In another aspect, an information processing apparatus communicable with a communication terminal operated by an operator includes circuitry to acquire information on the operator and activity information that includes information on an activity of the operator for a customer through a dialogue with the operator, determine needs of the customer based on the activity information, and transmit speech information to the communication terminal. The speech information includes the needs of the customer for display to the operator.

In another aspect, a non-transitory recording medium storing a plurality of program codes which, when executed by one or more processors, causes the one or more processors to perform a method. The method includes acquiring information on an operator and activity information that includes information on an activity of the operator for a customer through a dialogue with the operator, determining needs of the customer based on the activity information, and transmitting speech information to a communication terminal. The speech information includes the needs of the customer for display to the operator.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
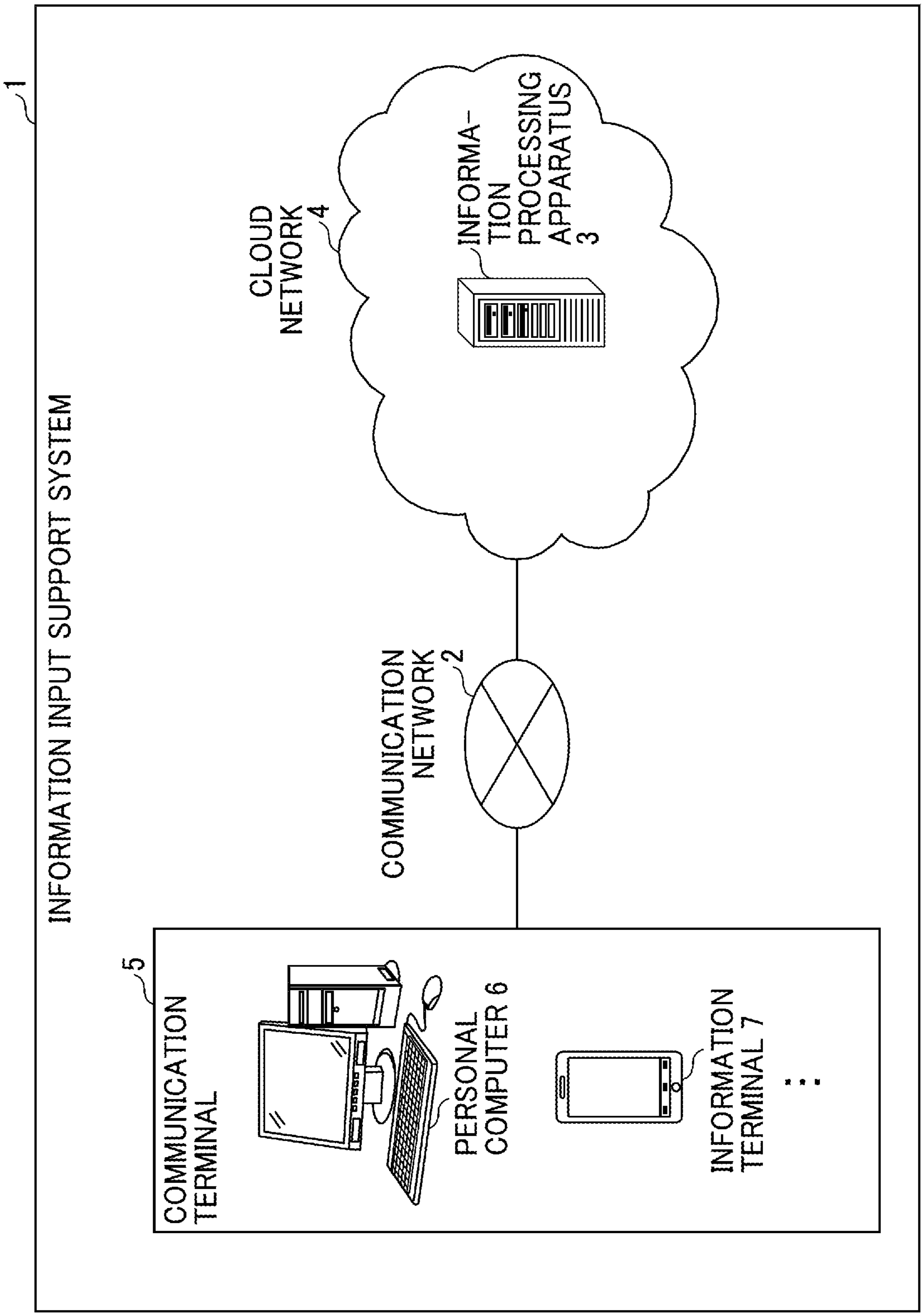
FIG. 1 is a schematic diagram illustrating an information input support system according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing apparatus, an information input support system, and a non-transitory recording medium according to embodiments of the present disclosure are described in detail below with reference to the drawings.

First Embodiment

System Overview

FIG. 1 is a schematic diagram illustrating an information input support system 1 according to one embodiment of the present disclosure. The information input support system 1 includes, for example, a communication terminal 5 connected to a communication network 2 such as the Internet, a cloud network 4, and an information processing apparatus 3 located in the cloud network 4.

The communication terminal 5 is a personal computer 6 or an information terminal 7 such as a smartphone or a tablet terminal, which is operated by an operator. The communication terminal 5 receives an operation performed by the operator to access a chatbot that supports information input or an operation performed by the operator to input a message to be transmitted to the chatbot. In the present embodiment, the chatbot is a function or a service that automatically conducts a dialogue with the operator. The communication terminal 5 displays, on the screen of the communication terminal 5, for example, a message input to the communication terminal 5 by the operator or a message received by the communication terminal 5 from the chatbot. In the present embodiment, the messages may be referred to as speech information.

The information processing apparatus 3 is an apparatus that provides functions of the chatbot that supports information input. For example, the information processing apparatus 3 receives, from the communication terminal 5 operated by the operator who belongs to a sales department of a company, the information on the operator, the information on a customer of the operator, and the information on an activity of the operator for the customer (activity information such as a daily report). In addition, the information processing apparatus 3 determines the issues and the needs that the customer of the operator has and the information to be proposed to the customer based on the information received from the communication terminal 5, and transmits the determined issues, needs, and information to the communication terminal 5. The information to be proposed to the customer is, for example, information for solving the issues and the needs of the customer, such as information and products in which the customer is interested.

As described above, the information input support system 1 determines the issues and the needs that the customer of the operator has, and presents the information to be proposed to the customer to the operator. The configuration of the information input support system 1 illustrated in FIG. 1 is given by way of example. The information processing apparatus 3 does not necessarily have all the functions of the chatbot. For example, some functions of the chatbot may be implemented by another service unit (external unit) provided by the cloud network 4. The information processing apparatus 3 may be located not in the cloud network 4 but, for example, in a local area network (LAN) of the company. The LAN may be, for example, a network to which access from an external network is restricted by, for example, a firewall. The number of information processing apparatuses 3 and communication terminals 5 included in the information input support system 1 may be any number. The communication network 2 may include, for example, a section connected by mobile communication or wireless communication such as a wireless LAN. In the dialogue between the operator and the chatbot, a speech made by the operator using voice is input.

In this disclosure, it is described as the information input support system 1 determines issues, needs, or any other information. However, depending on how high the degree of certainty is, the information input support system 1 may only presume or infer. For the descriptive purpose, the term "determine" or "determination" is used, but any term that means to provide information based on a certain level of certainty may be used, such as, "infer" or "inference."

Figure 2:
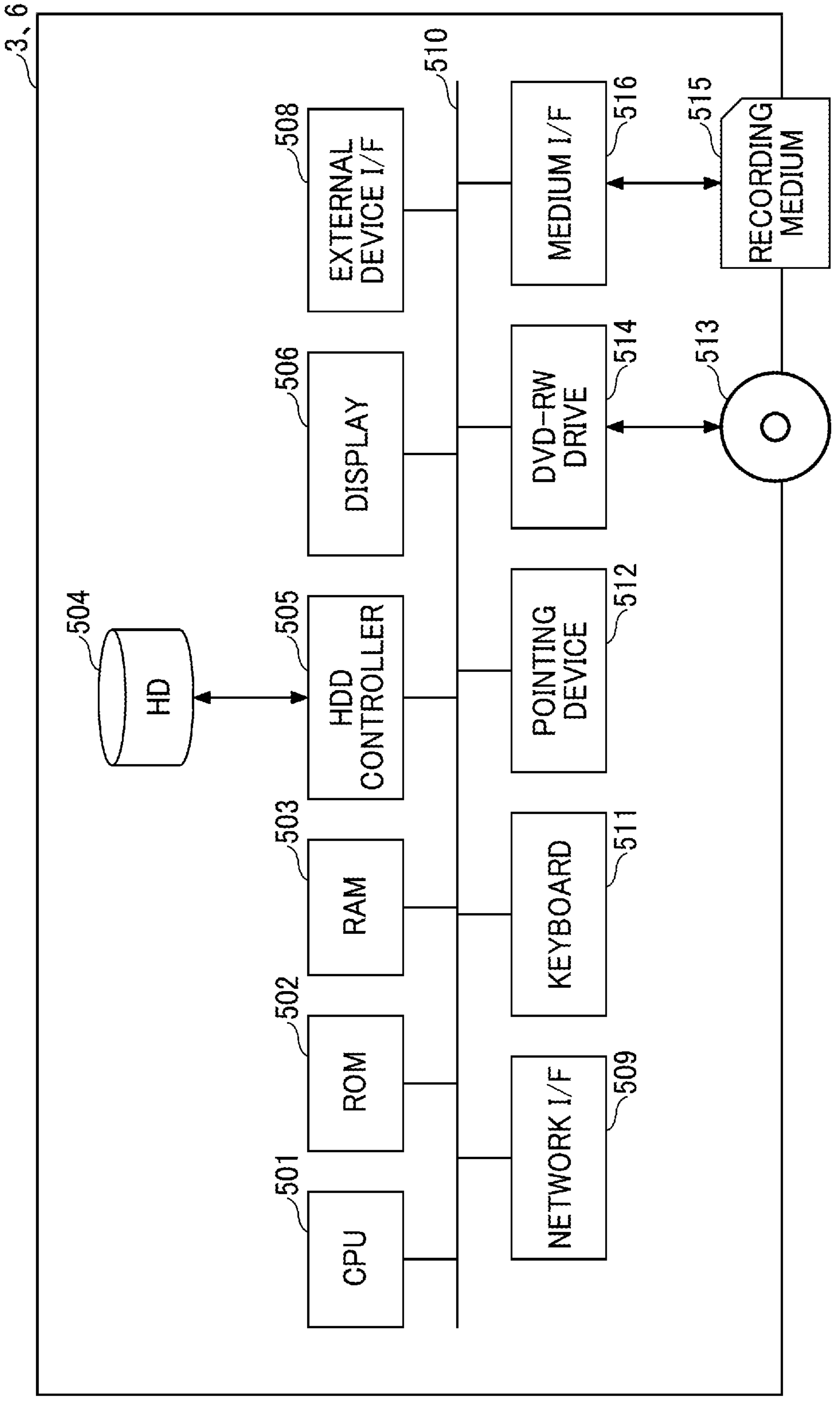
FIG. 2 is a block diagram illustrating a hardware configuration of an information processing apparatus and a personal computer according to one embodiment of the present disclosure.

Hardware Configuration of Information Processing Apparatus and Personal Computer FIG. 2 is a block diagram illustrating a hardware configuration of the information processing apparatus 3 and the personal computer 6 according to one embodiment of the present disclosure. As illustrated in FIG. 2, each of the information processing apparatus 3 and the personal computer 6 is implemented by a computer. The computer includes a central processing unit (CPU) 501, a read-only memory (ROM) 502, a random access memory (RAM) 503, a hard disk (HD) 504, a hard disk drive (HDD) controller 505, a display 506, an external device interface (I/F) 508, a network interface (I/F) 509, a bus line 510, a keyboard 511, a pointing device 512, a digital versatile disc rewritable (DVD-RW) drive 514, and a medium interface (I/F) 516.

The CPU 501 controls the entire operation of one of the information processing apparatus 3 and the personal computer 6 to which the CPU 501 belongs. The ROM 502 stores a program such as an initial program loader (IPL) to boot the CPU 501. The RAM 503 is used as a work area for the CPU 501. The HD 504 stores various data such as a control program. The HDD controller 505 controls the reading and writing of various data from and to the HD 504 under the control of the CPU 501. The display 506 displays various information such as a cursor, a menu, a window, characters, and images. The external device OF 508 is an interface for connection with various external devices. Examples of the external devices include, but are not limited to, a universal serial bus (USB) memory and a printer. The network OF 509 is an interface for data communication through the communication network 2. The bus line 510 is, for example, an address bus or a data bus, which electrically connects the components or elements such as the CPU 501 illustrated in FIG. 2 to each other.

The keyboard 511 serves as an input device provided with a plurality of keys used for, for example, inputting characters, numerical values, and various instructions. The pointing device 512 serves as an input device used for, for example, selecting or executing various instructions, selecting an object to be processed, and moving a cursor being displayed. The DVD-RW drive 514 controls the reading and writing of various data from and to a DVD-RW 513, which serves as a removable storage medium according to the present embodiment. The removable recording medium is not limited to the DVD-RW. For example, the removable recording medium may be a digital versatile disc recordable (DVD-R). The medium OF 516 controls the reading and writing (storing) of data from and to a recording medium 515 such as a flash memory.

Hardware Configuration of Information Terminal

Figure 3:
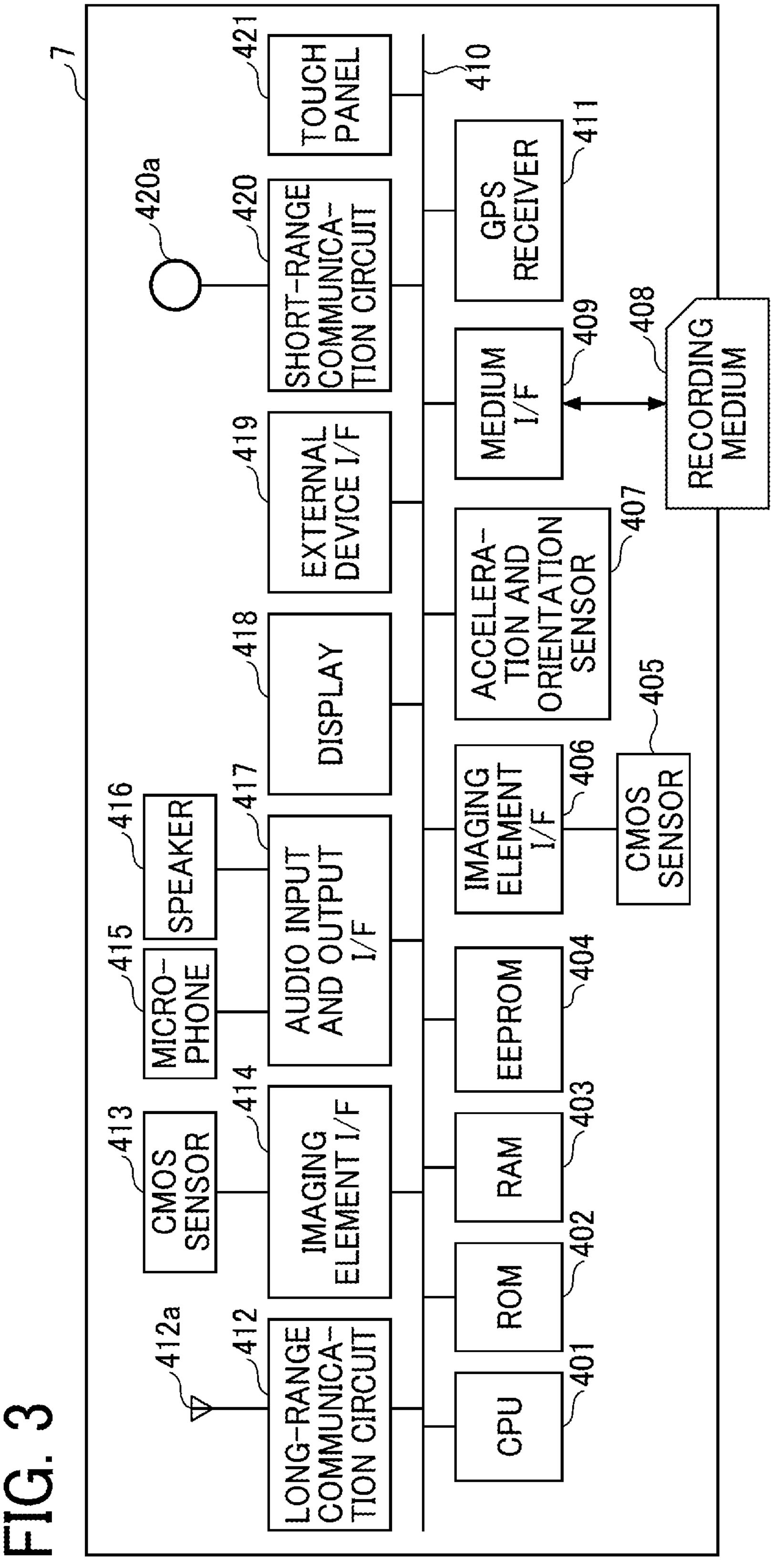
FIG. 3 is a block diagram illustrating a hardware configuration of an information terminal according to one embodiment of the present disclosure.

FIG. 3 is a block diagram illustrating a hardware configuration of the information terminal 7 such as a smartphone or a tablet terminal according to one embodiment of the present disclosure. As illustrated in FIG. 3, the information terminal 7 includes a CPU 401, a ROM 402, a RAM 403, an electrically erasable programmable read-only memory (EEPROM) 404, a complementary metal oxide semiconductor (CMOS) sensor 405, an imaging element interface (I/F) 406, an acceleration and orientation sensor 407, a medium OF 409, and a global positioning system (GPS) receiver 411.

The CPU 401 controls the entire operation of the information terminal 7. The ROM 402 stores a program such as an IPL to boot the CPU 401. The RAM 403 is used as a work area for the CPU 401. The EEPROM 404 reads or writes various data such as a program for the information terminal 7 under the control of the CPU 401. The CMOS sensor 405 is a kind of built-in imaging device that captures an image of an object (typically, a self-image of the operator) under the control of the CPU 401 to obtain the image data. In alternative to the CMOS sensor, an imaging element such as a charge-coupled device (CCD) sensor may be used. The imaging element OF 406 is a circuit that controls the driving of the CMOS sensor 405. The acceleration and orientation sensor 407 includes various sensors such as, for example, an electromagnetic compass for detecting geomagnetism, a gyrocompass, and an acceleration sensor. The medium OF 409 controls the reading and writing (storing) of data from and to a recording medium 408 such as a flash memory. The GPS receiver 411 receives a GPS signal from a GPS satellite.

The information terminal 7 includes a long-range communication circuit 412, a CMOS sensor 413, an imaging element OF 414, a microphone 415, a speaker 416, an audio input and output OF 417, a display 418, an external device OF 419, a short-range communication circuit 420, an antenna 420*a* of the short-range communication circuit 420, and a touch panel 421.

The long-range communication circuit 412 is a circuit for communicating with other devices via the communication network 2. The CMOS sensor 413 is a kind of built-in imaging device that captures an image of an object under the control of the CPU 401 to obtain the image data. The imaging element OF 414 is a circuit that controls the driving of the CMOS sensor 413. The microphone 415 is a built-in circuit that converts audio into electrical signals. The speaker 416 is a built-in circuit that converts electrical signals into physical vibrations to generate audio such as music or voice. The audio input and output I/F 417 is a circuit for inputting and outputting an audio signal between the microphone 415 and the speaker 416 under the control of the CPU 401. The display 418 is a kind of display that displays an image of an object and various icons, such as a liquid crystal display or an organic electro-luminescence (EL) display. The external device OF 419 is an interface for connection with various external devices. The short-range communication circuit 420 is a communication circuit in compliance with, for example, the near field communication (NFC) or BLUETOOTH. The touch panel 421 is a kind of input device that allows the operator to operate the information terminal 7 by touching a screen of the display 418.

The information terminal 7 includes a bus line 410. The bus line 410 is, for example, an address bus or a data bus, which electrically connects the components or elements such as the CPU 401 illustrated in FIG. 3 to each other.

Functions

Figure 4:
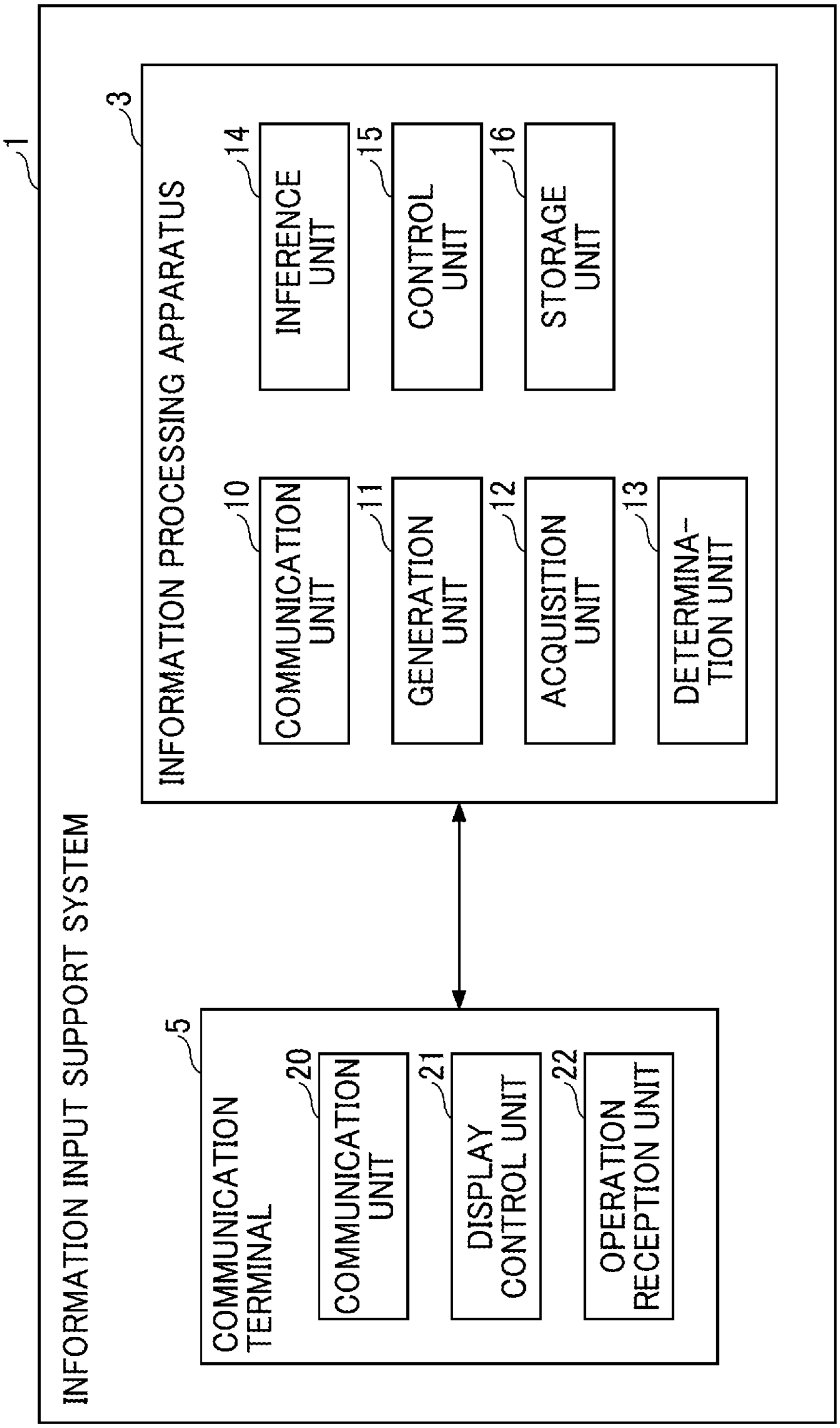
FIG. 4 is a block diagram illustrating a functional configuration of an information input support system according to one embodiment of the present disclosure.

FIG. 4 is a block diagram illustrating a functional configuration of the information input support system 1 according to one embodiment of the present disclosure. The information processing apparatus 3 includes a communication unit 10, a generation unit 11, an acquisition unit 12, a determination unit 13, an inference unit 14, and a control unit 15. These functional units provide functions implemented by the CPU 501 executing instructions included in one or more programs installed on the information processing apparatus 3. The storage unit 16 may be implemented by a storage device such as the HD 504 included in the information processing apparatus 3.

The communication unit 10 is a communication function that the information processing apparatus 3 has, and transmits and receives information to and from, for example, the communication terminal 5 via the communication network 2. For example, the communication unit 10 transmits speech information to a communication unit 20 included in the communication terminal 5. The speech information includes, for display to the operator, a greeting sentence, a question sentence, answer candidates, needs of the customer, information to be proposed to the customer, and the progress of the dialogue, for example.

The generation unit 11 generates speech information including, for display to the operator, a greeting sentence, a question sentence, answer candidates, needs of the customer, and information to be proposed to the customer. Among the above-described items included in the speech information, the needs of the customer and the information to be proposed to the customer are inferred by the inference unit 14.

The acquisition unit 12 acquires activity information that includes information on the operator and information on the activities of the operator for the customer based on answers to questions and reports of the sales activities received from the operator.

The determination unit 13 determines the degree of progress of an activity based on the activity information acquired by the acquisition unit 12. The determination method is described in detail later.

The inference unit 14 infers the needs of the customer based on, for example, the activity information of the operator and the degree of progress of the activity. In addition, the inference unit 14 infers information to be proposed by the operator to the customer based on information such as the activity information of the operator, the degree of progress of the activity, and the needs of the customer.

The control unit 15 manages a state in the dialogue with the operator and controls the transition of the state in accordance with a predetermined sequence of progress of the dialogue.

The storage unit 16 stores, for example, the activity information of the operator, the degree of progress of the activity, the needs of the customer, and the information to be proposed to the customer.

The communication terminal 5 includes the communication unit 20, a display control unit 21, and an operation reception unit 23. These functional units provide functions implemented by the CPU 501 executing instructions included in one or more programs installed on the personal computer 6 that is one of the communication terminals 5. Alternatively, these functional units provide functions implemented by the CPU 401 executing instructions included in one or more programs installed on the information terminal 7 that is another one of the communication terminals 5.

The communication unit 20 is a communication function that the communication terminal 5 has, and transmits and receives information to and from the information processing apparatus 3 via the communication network 2, for example. For example, the communication unit 20 receives, from the communication unit 10 of the information processing apparatus 3, the speech information including, for display to the operator, the greeting sentence, the question sentence, the answer candidates, the needs of the customer, the information to be proposed to the customer, and the progress of the dialogue, for example.

The display control unit 21 displays, on the screen of the communication terminal 5, the speech information including, for display to the operator, the greeting sentence, the question sentence, the answer candidates, the needs of the customer input by the operator, the needs of the customer inferred by the inference unit 14 of the information processing apparatus 3, the information to be proposed to the customer, the degree of progress of the activity for the customer, and the progress of the dialogue.

The operation reception unit 22 receives operations such as inputting characters and pressing buttons performed by the operator via the keyboard 511 and the pointing device 512 of the communication terminal 5. In addition, the operation reception unit 22 receives the input of the speech made by the operator with voice in the dialogue via, for example, the microphone 415 of the information terminal 7 that is one of the communication terminals 5.

Flowchart of State Transition in Information Input Support System

Figure 5:
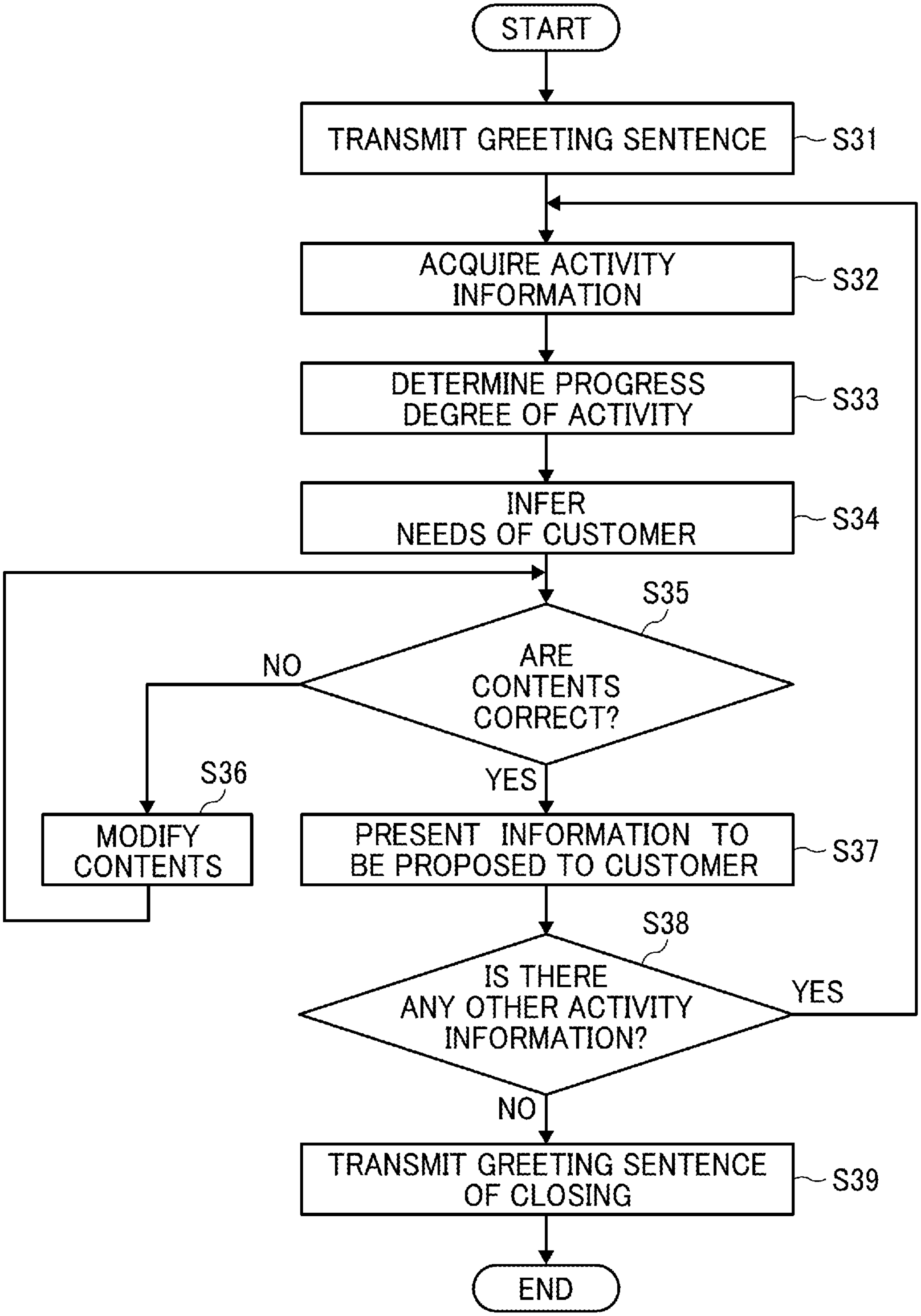
FIG. 5 is a flowchart of state transition in an information input support system according to one embodiment of the present disclosure.

FIG. 5 is a flowchart of the state transition in the information input support system 1 according to one embodiment of the present disclosure. In the flowchart of the state transition of FIG. 5, the transition of the state of the chatbot that conducts the dialogue with the operator is illustrated. The steps in the processing illustrated in FIG. 5 are described below.

Step S31: The generation unit 11 of the information processing apparatus 3 generates speech information including a greeting sentence to be transmitted to the operator. The communication unit 10 of the information processing apparatus 3 transmits the generated speech information to the communication unit 20 of the communication terminal 5.

Step S32: The acquisition unit 12 of the information processing apparatus 3 acquires the activity information including the information on the operator and the information on the activities of the operator for the customer based on the answers to the questions and the reports of the sales activities received from the operator.

Step S33: The determination unit 13 of the information processing apparatus 3 determines the degree of progress of the activity based on the activity information acquired in the processing of step S32.

Step S34: The inference unit 14 of the information processing apparatus 3 infers the issues and the needs that the customer of the operator has, based on the activity information and the degree of progress of the activity.

Step S35: The control unit 15 of the information processing apparatus 3 checks with the operator whether the pieces of information acquired in the processing of steps S32 to S34 are correct. When the pieces of information are correct (YES in step S35), the processing proceeds to step S37. When the pieces of the information are not correct (NO in step S35), the processing proceeds to step S36.

Step S36: The storage unit 16 of the information processing apparatus 3 stores the information modified by the operator.

Step S37: The inference unit 14 of the information processing apparatus 3 infers, for display to the operator, the information to be proposed to the customer.

Step S38: The control unit 15 of the information processing apparatus 3 checks with the operator whether the operator has any report of another activity. When the operator has a report of another activity (YES in step S38), the processing proceeds to step S32. When the operator does not have any report of another activity (NO in step S38), the processing proceeds to step S39.

Through the above-described processing, the information input support system 1 manages the state in the dialogue with the operator and controls the transition of the state. The processing executed in each step is described in detail below.

Sequence Chart of Processing of Dialogue in Information Input Support System

Figure 6:
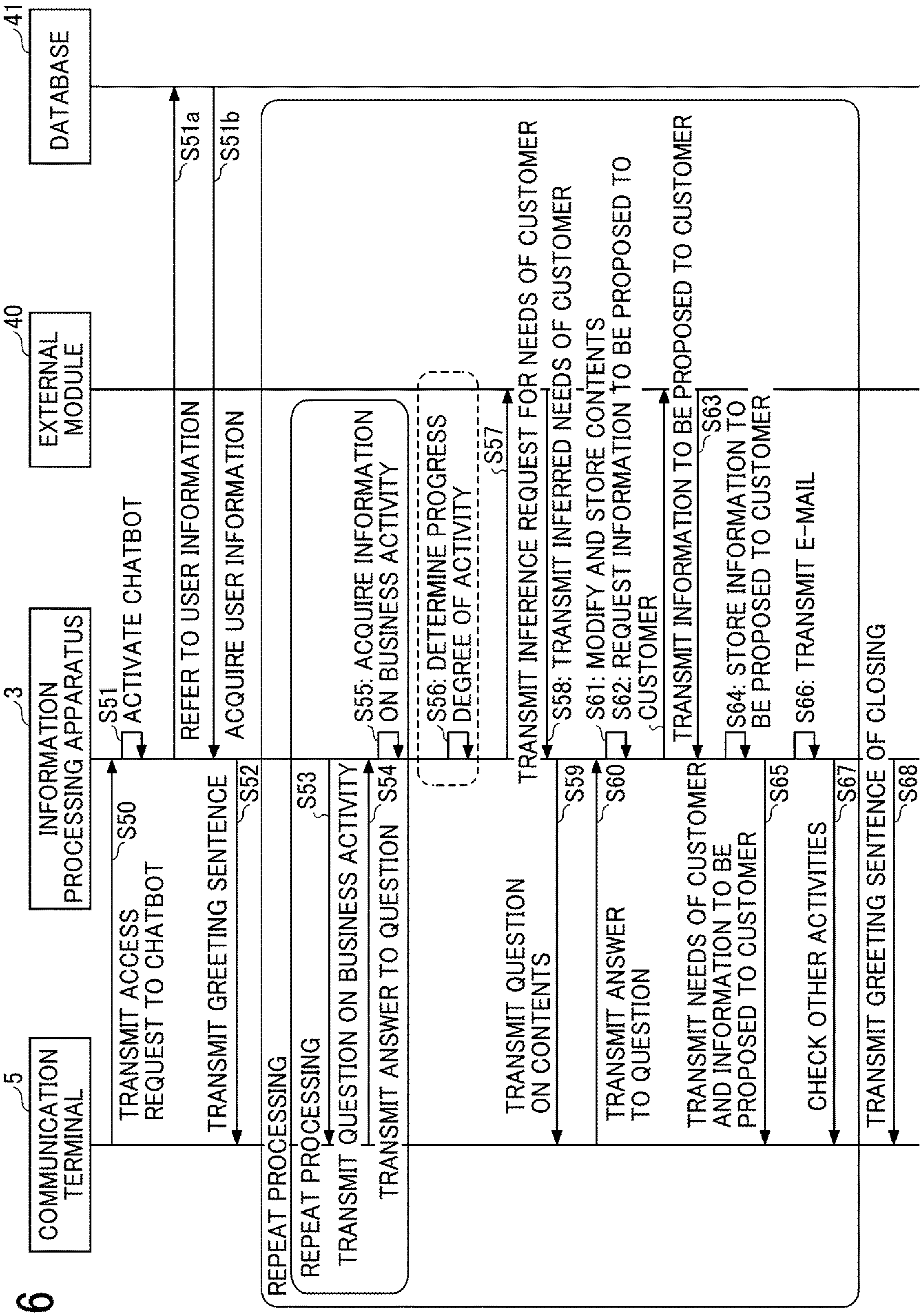
FIG. 6 is a sequence chart illustrating the processing of dialogue in an information input support system according to one embodiment of the present disclosure.

FIG. 6 is a sequence chart illustrating the processing of dialogue in the information input support system 1 according to one embodiment of the present disclosure. According to the sequence chart, the chatbot that supports information input acquires information on the activities of the operator while conducting a dialogue with the operator who performs sales activities. The processing executed in each step of the sequence chart illustrated in FIG. 6 is described below with reference to FIGS. 7 to 12 in which display screens of the communication terminal 5 (information terminal 7) operated by the operator are illustrated.

Step S50: The operation reception unit 22 of the communication terminal 5 receives an operation performed by the operator to access the chatbot. The operation performed by the operator may be, for example, inputting the content of some speech made by the operator using an application for enabling a dialogue with the chatbot. The communication unit 20 of the communication terminal 5 transmits a request for accessing the chatbot to the communication unit 10 of the information processing apparatus 3. In the present embodiment, the request for accessing the chatbot includes information (such as a user identifier) for identifying the operator.

In addition, the acquisition unit 12 of the information processing apparatus 3 may acquire information on the schedule of the activities of the operator from a database at a predetermined time. For example, it is assumed that the acquiring unit 12 acquires, at 9:00 a.m. every morning, information (such as a company name) on the schedule of the activities in which a business meeting is scheduled on the day. In this way, the dialogue is efficiently conducted with the operator who reports the activities after the business meeting.

Step S51: The control unit 15 of the information processing apparatus 3 activates the chatbot in response to the request for accessing the chatbot.

Figure 15A:
FIGS. 15A and 15B are diagrams each illustrating the user information in a database according to one embodiment of the present disclosure.
Figure 15B:
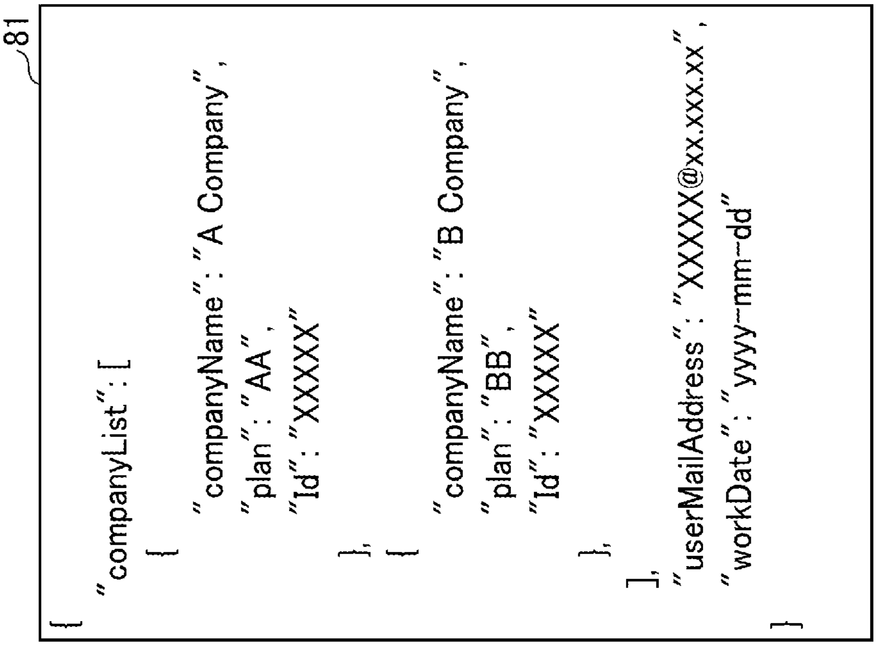

Step S51*a*: The acquisition unit 12 of the information processing apparatus 3 accesses a database 41 to refer to the user information corresponding to the information for identifying the operator included in the request for accessing the chatbot received in the processing of step S50. FIGS. 15A and 15B are diagrams each illustrating the user information in the database 41 according to one embodiment of the present disclosure. The database 41 includes user information 80 and user information 81 illustrated in FIGS. 15A and 15B, respectively. The user information 80 includes an identifier ("userid") that identifies the operator and information ("userMailAddress") that indicates an e-mail address of the operator. The user information 81 includes schedule information ("companyList") that is associated with the e-mail address of the operator on a designated date ("workDate"). The schedule information ("companyList") includes a company name ("companyName"), a name of a plan ("plan"), and an identifier ("Id") that identifies the plan. The user information 80 may include information relating to the user name of the operator. Referring back to FIG. 6, the description continues.

Step S51*b*: The acquisition unit 12 of the information processing apparatus 3 acquires the user information referred to in the processing of step S51*a* from the database 41. The storage unit 17 of the information processing apparatus 3 stores the user information.

Figure 7:
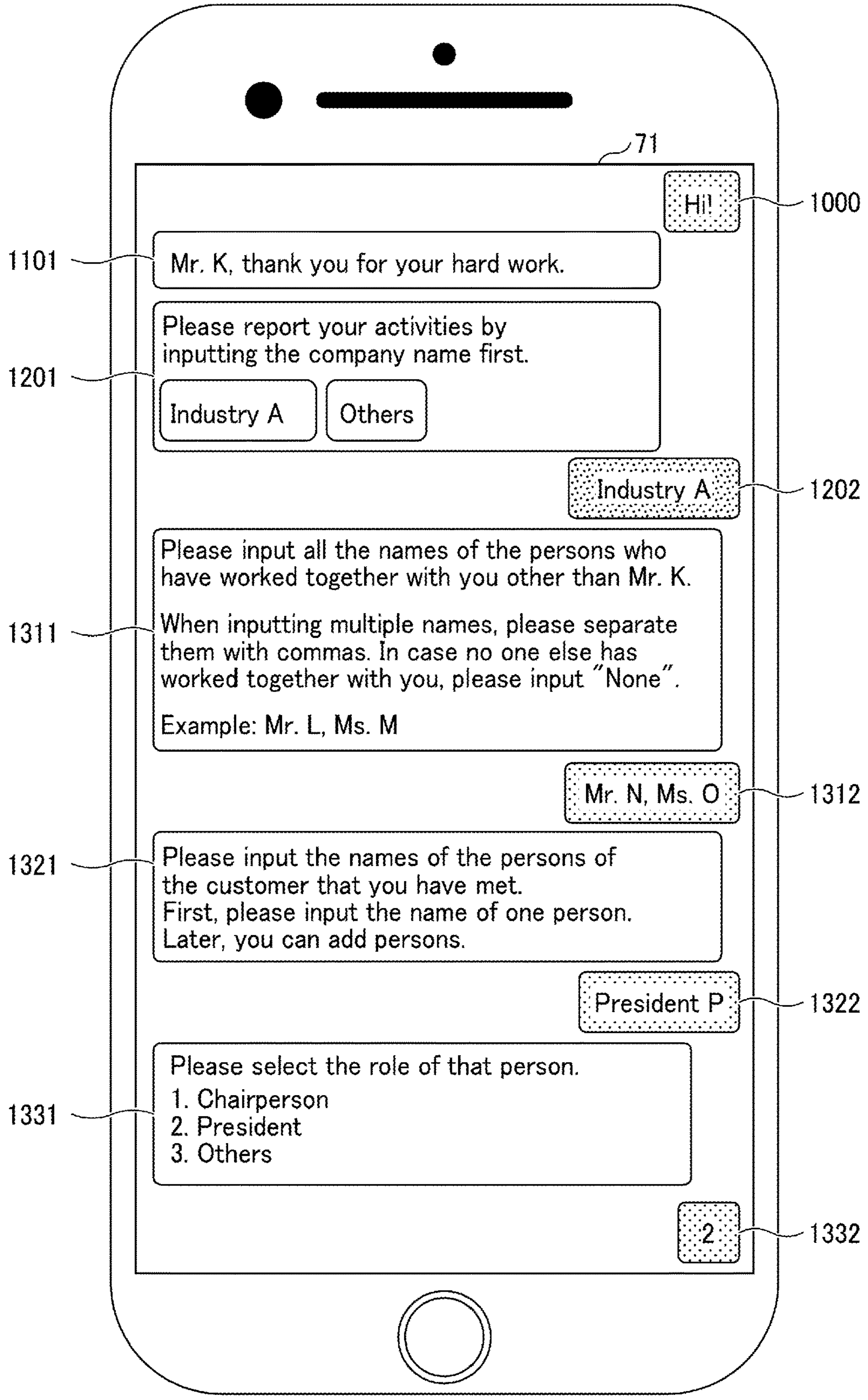
FIG. 7 is a diagram illustrating the first display screen of an information terminal according to one embodiment of the present disclosure.

Step S52: The generation unit 11 of the information processing apparatus 3 generates speech information including a greeting sentence to be transmitted to the operator. The speech information is, for example, "Mr. K, thank you for your hard work." In the present embodiment, the storage unit 17 of the information processing apparatus 3 stores, for example, the user information for associating a user identifier and a user name with each other in advance. The generation unit 11 acquires, based on the user information, "K" that is a user name from the user identifier to generate the speech information. The communication unit 10 of the information processing apparatus 3 transmits the generated speech information to the communication unit 20 of the communication terminal 5. The display control unit 21 of the communication terminal 5 displays the speech information on the screen of the communication terminal 5. FIG. 7 is a diagram illustrating the first display screen of the information terminal 7 according to one embodiment of the present disclosure. On a display screen 71 illustrated in FIG. 7, the speeches made by the operator are presented on the right side of the screen, and the speeches made by the chatbot are presented on the left side of the screen. In a speech 1000, a speech ("Hi!") input by the operator for starting the dialogue with the chatbot in the processing of step S50 is presented. In a speech 1101, a speech ("Mr. K, thank you for your hard work.") transmitted by the chatbot as a greeting in the processing of step S52 in response to the speech 1000 made by the operator is presented. Referring back to FIG. 6, the description continues.

Step S53: The generation unit 11 of the information processing apparatus 3 generates speech information that includes a question sentence for asking a question to the operator in order to acquire information on the sales activities to be reported by the operator. The content of the question includes, for example, the company name of the customer of the sales activities, the names of the other persons belonging to the sales department who work together, the names of the persons of the customer, the roles of the persons of the customer, or the result of the sales activities. The communication unit 10 of the information processing apparatus 3 transmits the generated speech information to the communication unit 20 of the communication terminal 5. The display control unit 21 of the communication terminal 5 displays the speech information on the screen of the communication terminal 5.

Step S54: The operation reception unit 22 of the communication terminal 5 receives an operation performed by the operator to input an answer to the question. The communication unit 20 of the communication terminal 5 transmits speech information including the answer input by the operator to the communication unit 10 of the information processing apparatus 3.

Figure 8:
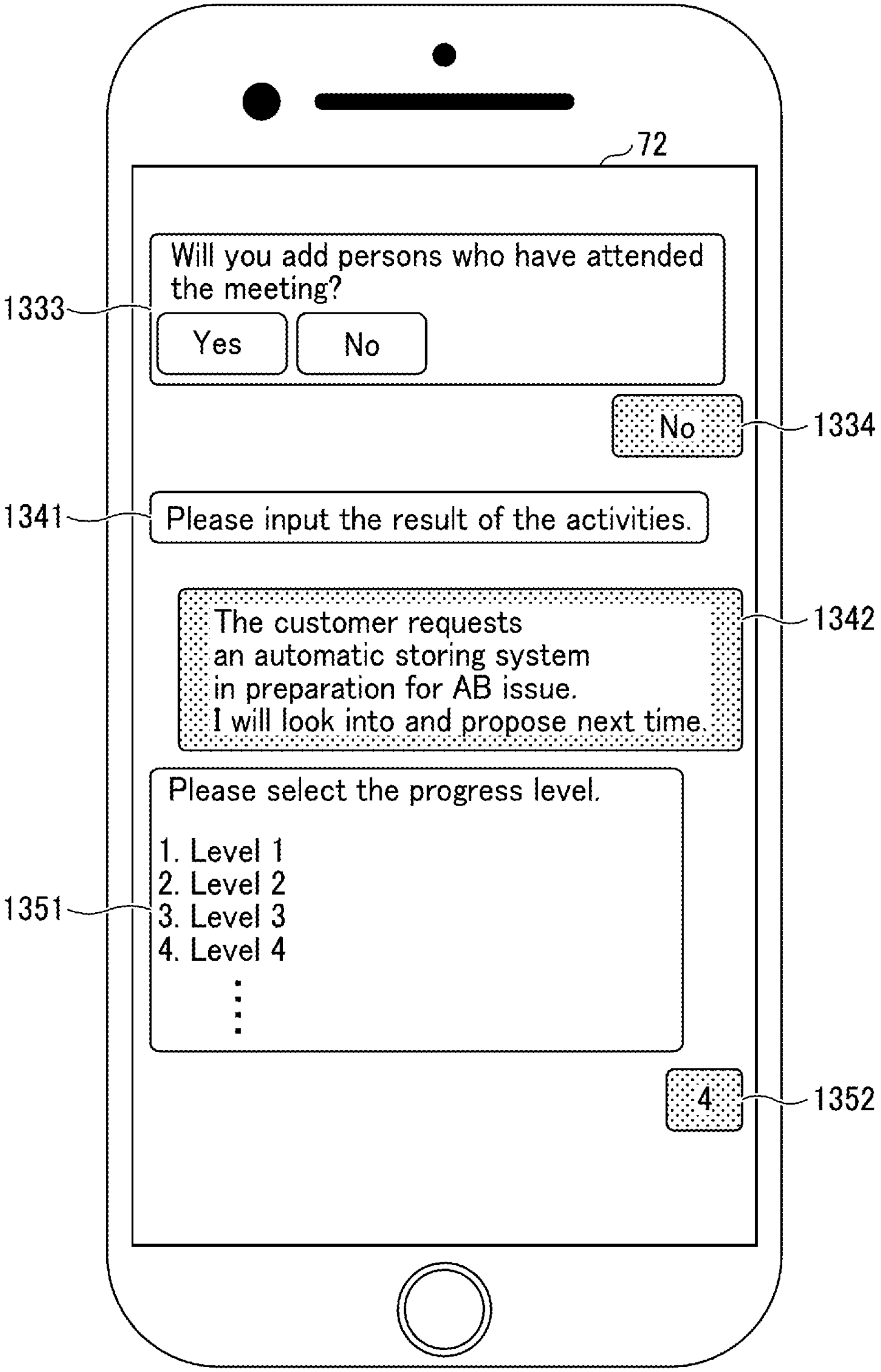
FIG. 8 is a diagram illustrating the second display screen of an information terminal according to one embodiment of the present disclosure.

Step S55: The acquisition unit 12 of the information processing apparatus 3 repeatedly executes the processing of steps S53 and S54 to acquire, based on the answer and the report regarding the sales activities received from the operator, the activity information of the operator. The activity information includes, for example, the information on the operator, the company name of the customer, the names of the persons of the customer, the information on the business meeting between the operator and the customer, and the information on the participants in the business meeting. The information on the operator includes, for example, the name of the operator, the department to which the operator belongs, the e-mail address of the operator, the company names of the customers for which the operator is responsible, and the dates of the sales activities for the customers. The storage unit 16 of the information processing apparatus 3 stores the activity information. As the question to the operator in the processing of step S53, for example, a question sentence "Please report your activities by inputting the company name first." is presented in a speech 1201 of FIG. 7. In addition, "Industry A" and "Others" are presented in the speech 1201 as answer candidates for the answer input by the operator in the processing of step S54. In a speech 1202, the answer "Industry A" selected by the operator from the answer candidates presented in the speech 1201 is presented as an answer to the question. In a speech 1311, a question sentence for asking the names of the other persons belonging to the sales department who work together is presented. In a speech 1312, the answer input by the operator to the question presented in the speech 1311 is presented. In a speech 1321, a question sentence for asking the name of one person of the customer is presented. In a speech 1322, the answer input by the operator to the question presented in the speech 1321 is presented. In a speech 1331, a question sentence for asking the role of the person of the customer and answer candidates are presented. The role of the person of the customer may be, for example, the position of the person of the customer (such as a chairperson, a president, or others) or the type of job (such as sales, engineering, or accounting). In a speech 1332, a number ("2") selected by the operator from the answer candidates presented in the speech 1331 is presented as an answer to the question. FIG. 8 is a diagram illustrating the second display screen of the information terminal 7 according to one embodiment of the present disclosure. In a speech 1333 on a display screen 72 illustrated in FIG. 8, a question sentence for asking whether to add the names of the other persons of the customer who have participated in the business meeting is presented. In addition, answer candidates ("Yes" and "No") are presented in the speech 1333. In a speech 1334, the answer ("No") selected by the operator from the answer candidates presented in the speech 1333 is presented as an answer to the question. In a speech 1341, a question sentence for asking the result of the sales activities ("Please input the result of the activities.") is presented. In a speech 1342, the result of the sales activities input by the operator is presented as an answer to the question presented in the speech 1341. Referring back to FIG. 6, the description continues.

Figure 9:
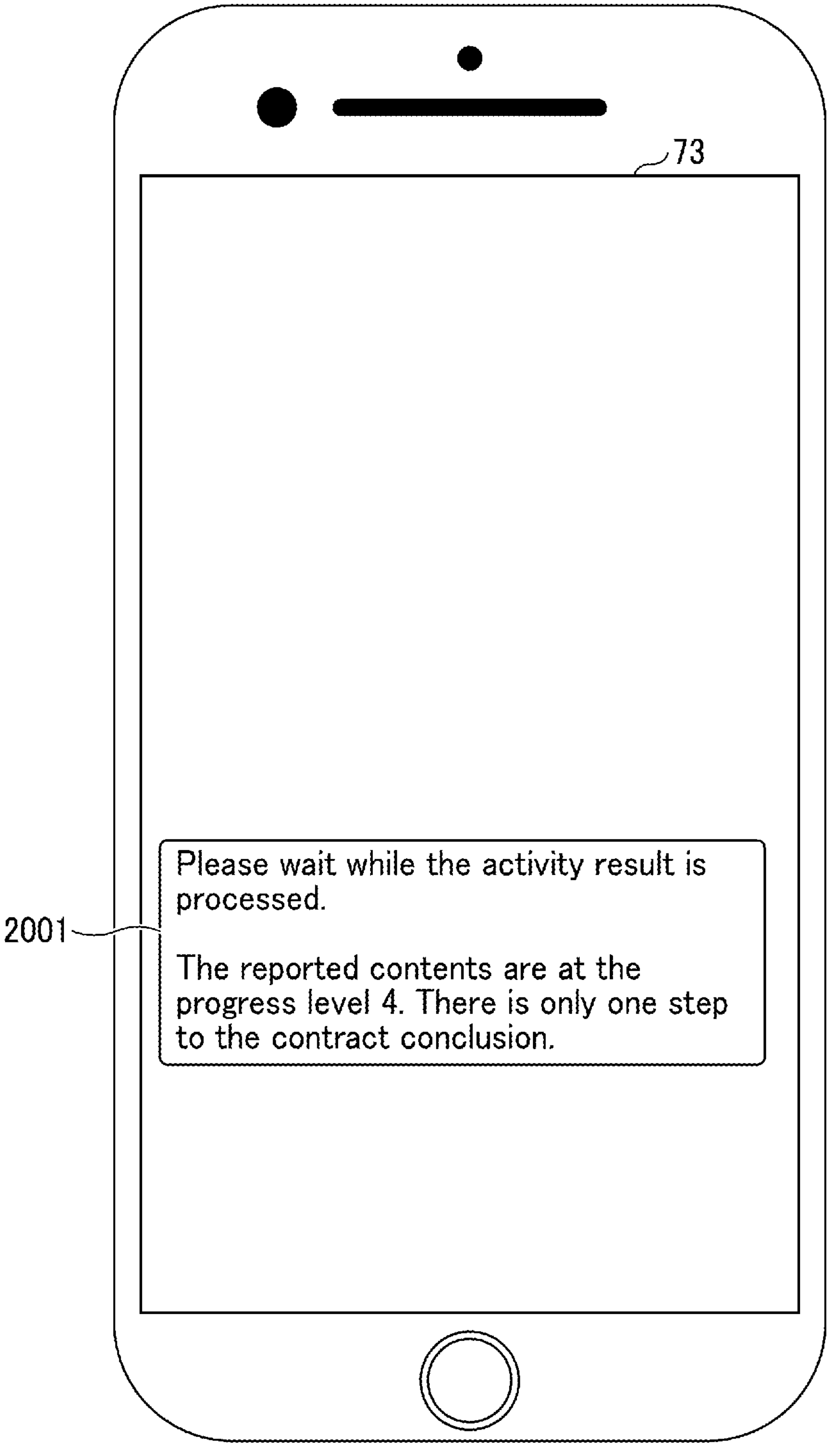
FIG. 9 is a diagram illustrating the third display screen of an information terminal according to one embodiment of the present disclosure.

Step S56: The determination unit 13 of the information processing apparatus 3 determines the degree of progress of the activity based on, for example, the activity information acquired by the acquisition unit 12. The determination unit 13 determines the degree of progress of the activity, for example, based on an answer obtained by asking the operator about the degree of progress of the activity. Alternatively, the determination unit 13 may estimate the degree of progress of the activity based on the information such as the activity information acquired by the acquisition unit 12. Still, alternatively, the determination unit 13 may determine the degree of progress of the activity by requesting an external module 40 to estimate the degree of progress of the activity. In the case of requesting the external module 40 to estimate the degree of progress of the activity, the communication unit 10 of the information processing apparatus 3 transmits a request for estimating the degree of progress of the activity including the activity information acquired by the acquisition unit 12 to the external module 40 and receives the degree of progress of the activity estimated by the external module 40 from the external module 40. As a screen display when the operator is asked about the degree of progress of the activity, for example, a question sentence "Please select the progress level." for asking the operator about the degree of progress of the activity and answer candidates are presented in a speech 1351 of FIG. 8. In the present embodiment, as the numerical value of the progress level is larger, the degree of progress of the activity is higher. In a speech 1352, a number ("4") selected by the operator from the answer candidates presented in the speech 1351 is presented as an answer to the question. FIG. 9 is a diagram illustrating the third display screen of the information terminal 7 according to one embodiment of the present disclosure. As the screen display in the case where the degree of progress of the activity estimated by the external module 40 is used, for example, the degree of progress of the activity estimated by the external module 40 based on the activity information acquired from the operator is presented to the operator in a speech 2001 on a display screen 73 illustrated in FIG. 9. Referring back to FIG. 6, the description continues.

Step S57: The inference unit 14 of the information processing apparatus 3 infers the needs of the customer based on, for example, the activity information acquired by the acquisition unit 12 and the degree of progress of the activity determined by the determination unit 13. In response to an instruction from the inference unit 14, the communication unit 10 of the information processing apparatus 3 transmits, to the external module 40, a request for inferring the needs of the customer including information such as the activity information and the degree of progress of the activity.

Step S58: The external module 40 uses a machine learning model to infer the needs of the customer based on the information such as the activity information and the degree of progress of the activity. The machine learning model has been trained in advance by being provided with, for example, activity information, degrees of progress of activities, and needs of other customers as teacher data. Alternatively, the external module 40 may infer the needs of the customer by searching, for example, the Internet or databases, using the vocabulary included in the information such as the activity information and the degree of progress of the activity. The communication unit 10 of the information processing apparatus 3 receives the needs of the customer inferred by the external module 40 from the external module 40.

Step S59: The generation unit 11 of the information processing apparatus 3 generates speech information that includes the activity information acquired by the acquisition unit 12, the degree of progress of the activity determined by the determination unit 13, and a question sentence for checking with the operator whether the needs of the customer inferred by the inference unit 14 are correct. The communication unit 10 of the information processing apparatus 3 transmits the generated speech information to the communication unit 20 of the communication terminal 5. The display control unit 21 of the communication terminal 5 displays the speech information on the screen of the communication terminal 5.

Figure 10:
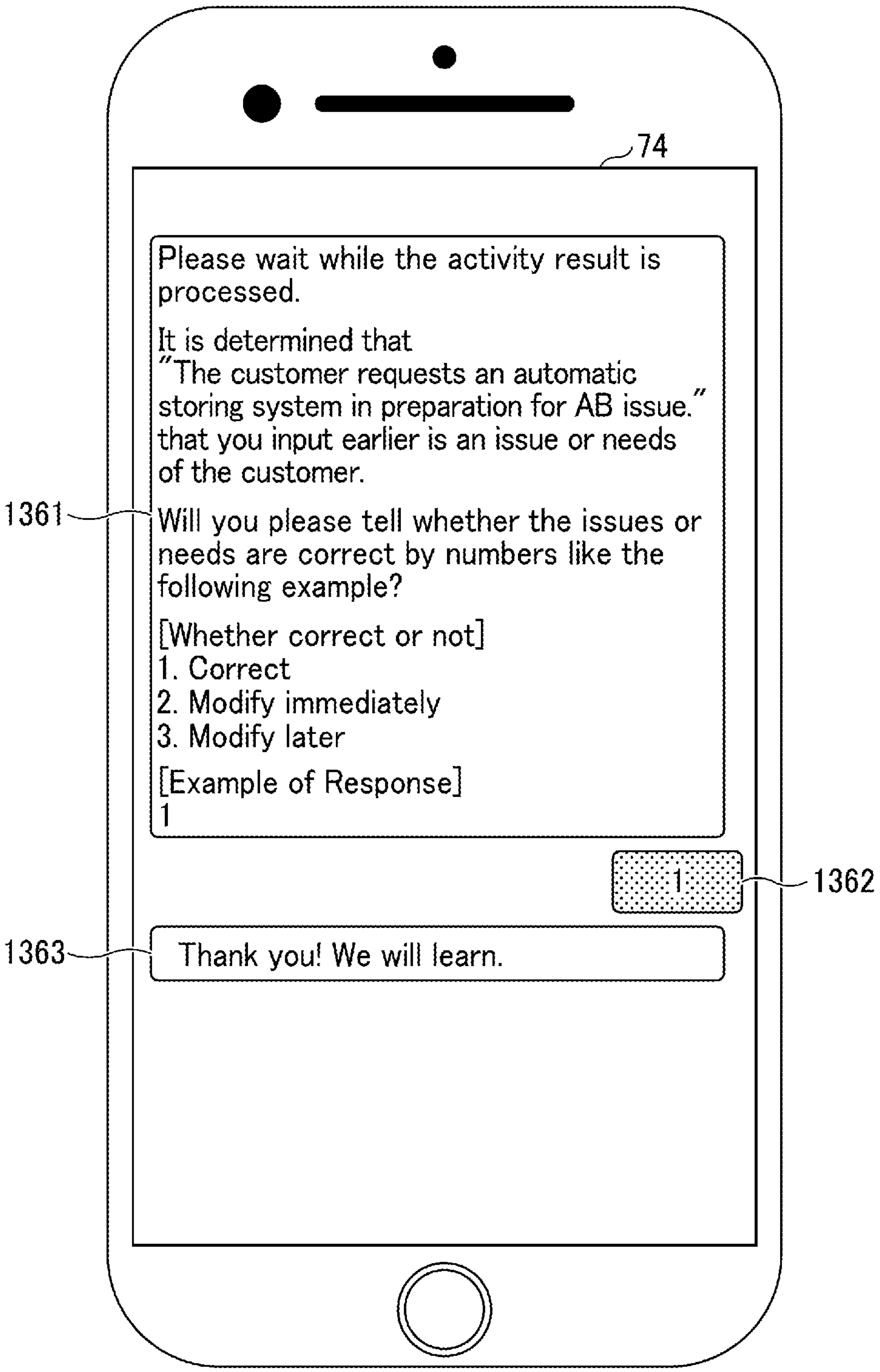
FIG. 10 is a diagram illustrating the fourth display screen of an information terminal according to one embodiment of the present disclosure.
Figure 11:
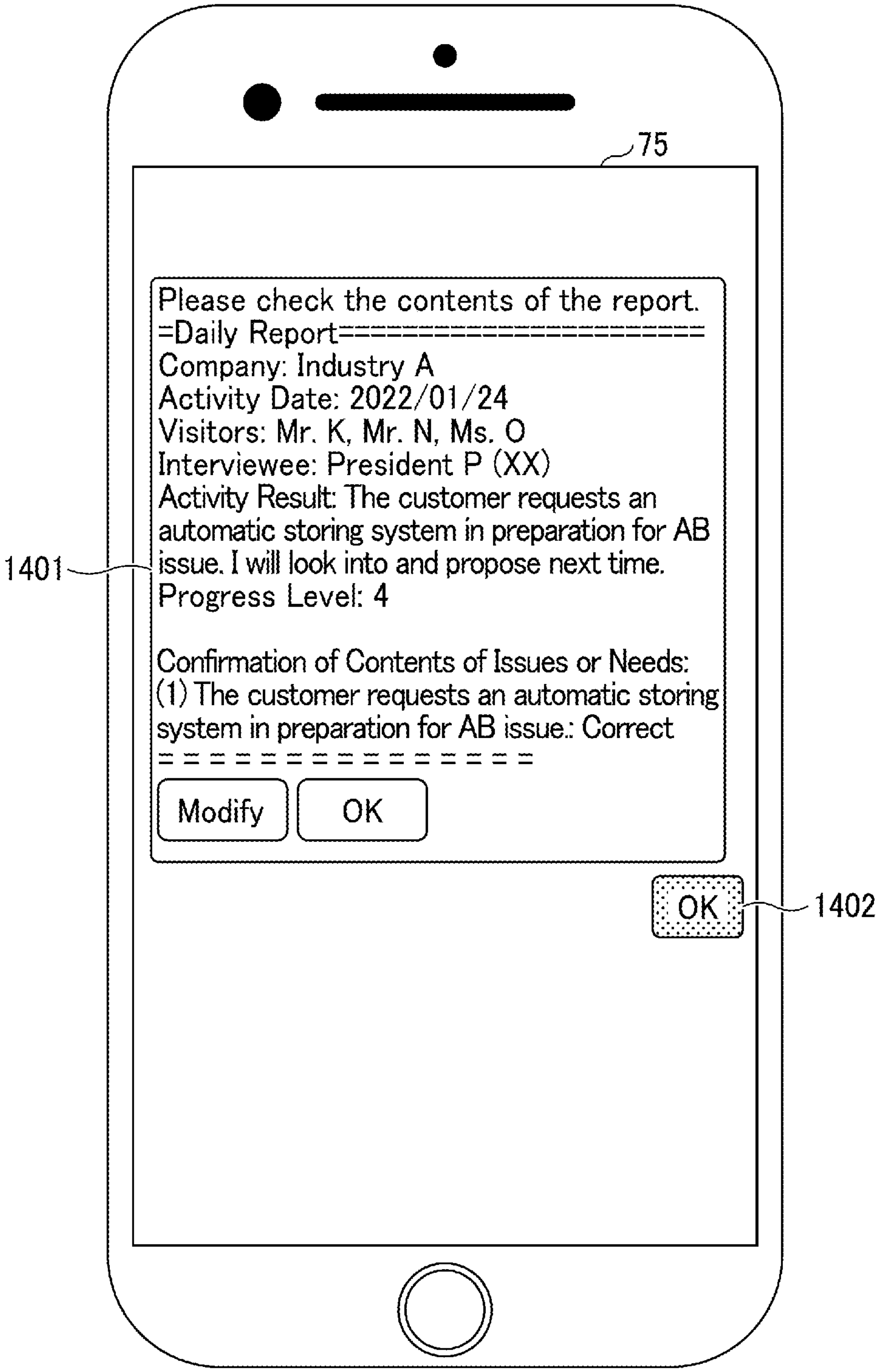
FIG. 11 is a diagram illustrating the fifth display screen of an information terminal according to one embodiment of the present disclosure.

Step S60: The operation reception unit 22 of the communication terminal 5 receives an operation performed by the operator to input an answer to the question. The communication unit 20 of the communication terminal 5 transmits speech information including the answer input by the operator to the communication unit 10 of the information processing apparatus 3. FIG. 10 is a diagram illustrating the fourth display screen of the information terminal 7 according to one embodiment of the present disclosure. In a speech 1361 on a display screen 74 illustrated in FIG. 10, the question sentence for checking with the operator whether the needs of the customer are correct and answer candidates are presented. When the needs of the customer presented in the speech 1361 are correct (met), the operator selects "1" from the answer candidates. When the needs of the customer are not correct and modification is made immediately, the operator selects "2." When the needs of the customer are not correct and modification is made later, the operator selects "3." In a speech 1362, a number ("1") selected by the operator from the answer candidates presented in the speech 1361 is presented as an answer to the question. In a speech 1363, a response of the chatbot to the answer input by the operator presented in the speech 1362 is presented. FIG. 11 is a diagram illustrating the fifth display screen of the information terminal 7 according to one embodiment of the present disclosure. In a speech 1401 on a display screen 75 illustrated in FIG. 11, the contents of the report (the contents of the activity), the progress level (the degree of progress of the activity), a question sentence for checking with the operator whether the needs of the customer are correct, and answer candidates are presented. When the contents presented in the speech 1401 are required to be modified, the operator selects "Modify" from the answer candidates. When the contents presented in the speech 1401 are correct, the operator selects "OK" from the answer candidates. In a speech 1402, the answer "OK" selected by the operator to the question presented in the speech 1401 is presented. Referring back to FIG. 6, the description continues.

Step S61: The storage unit 16 of the information processing apparatus 3 stores the activity information, the degree of progress of the activity, and the needs of the customer that are modified based on the answer input by the operator in the processing of step S60.

Step S62: The inference unit 14 of the information processing apparatus 3 infers information (also referred to as customer proposal information) to be proposed by the operator to the customer based on information such as the activity information of the operator, the degree of progress of the activity, and the needs of the customer. In response to an instruction from the inference unit 14, the communication unit 10 of the information processing apparatus 3 transmits a request for inferring the customer proposal information to the external module 40. The request includes information such as the activity information, the degree of progress of the activity, and the needs of the customer.

Step S63: The external module 40 uses a machine learning model to infer the information to be proposed to the customer based on information such as the activity information, the degree of progress of the activity, and the needs of the customer. The machine learning model has been trained in advance by being provided with, for example, activity information, degrees of progress of activities, needs of other customers, and information to be proposed to customers as teacher data. Alternatively, the external module 40 may infer the information to be proposed to the customer by searching, for example, the Internet or databases, using the vocabulary included in the information such as the activity information, the degree of progress of the activity, the needs of the customer, and the information to be proposed to the customer. The communication unit 10 of the information processing apparatus 3 receives the information to be proposed to the customer inferred by the external module 40 from the external module 40.

Step S64: The storage unit 16 of the information processing apparatus 3 stores the information to be proposed to the customer.

Figure 12:
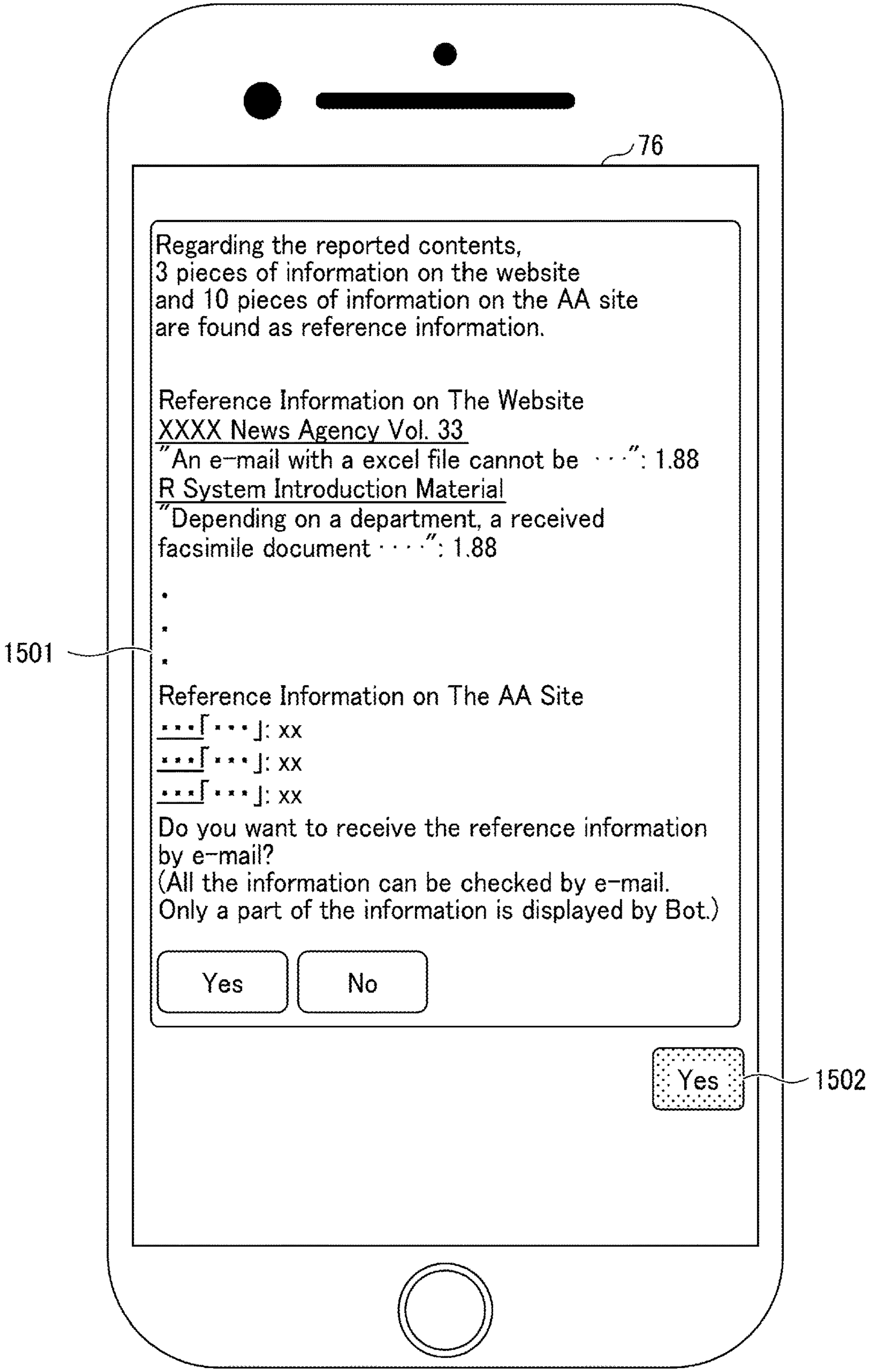
FIG. 12 is a diagram illustrating the sixth display screen of an information terminal according to one embodiment of the present disclosure.

Step S65: The generation unit 11 of the information processing apparatus 3 generates speech information for display to the operator, including at least either the needs of the customer inferred by the inference unit 14 or the information to be proposed to the customer inferred by the inference unit 14. The communication unit 10 of the information processing apparatus 3 transmits the generated speech information to the communication unit 20 of the communication terminal 5. The display control unit 21 of the communication terminal 5 displays the speech information on the screen of the communication terminal 5. FIG. 12 is a diagram illustrating the sixth display screen of the information terminal 7 according to one embodiment of the present disclosure. In a speech 1501 on a display screen 76 illustrated in FIG. 12, the customer proposal information to be proposed to the customer inferred by the inference unit 14 in the processing of steps S62 to S63, a question sentence for checking with the operator whether to transmit the customer proposal information to the e-mail address of the operator, and answer candidates to the question are presented. In a speech 1502, an answer ("Yes") selected by the operator from the answer candidates presented in the speech 1501 is presented as an answer to the question. Referring back to FIG. 6, the description continues.

Step S66: The communication unit 10 of the information processing apparatus 3 transmits, to the e-mail address of the operator, an e-mail including the customer proposal information presented to the operator in the processing of step S65.

Figure 13:
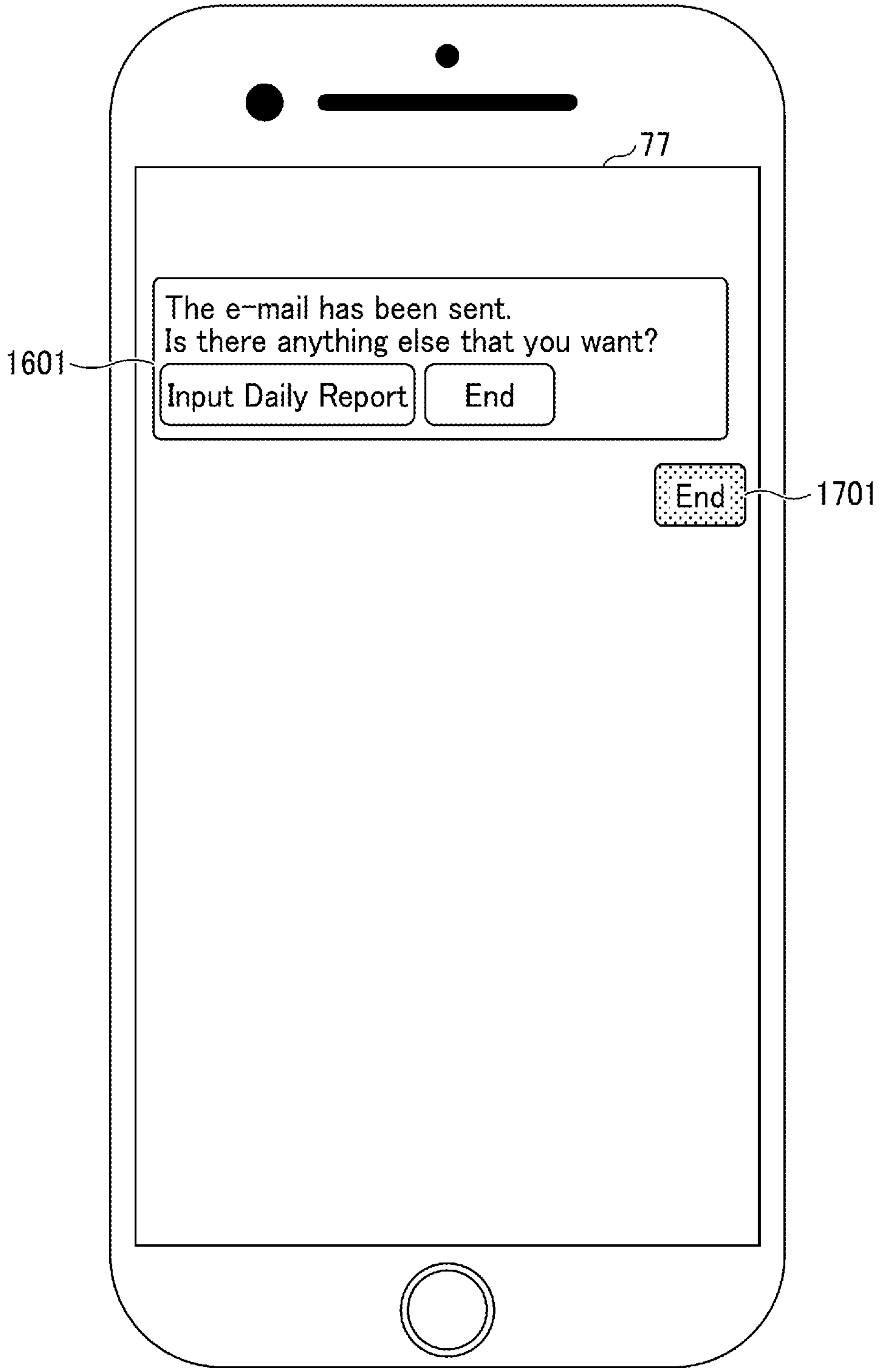
FIG. 13 is a diagram illustrating the seventh display screen of an information terminal according to one embodiment of the present disclosure.
Figure 14:
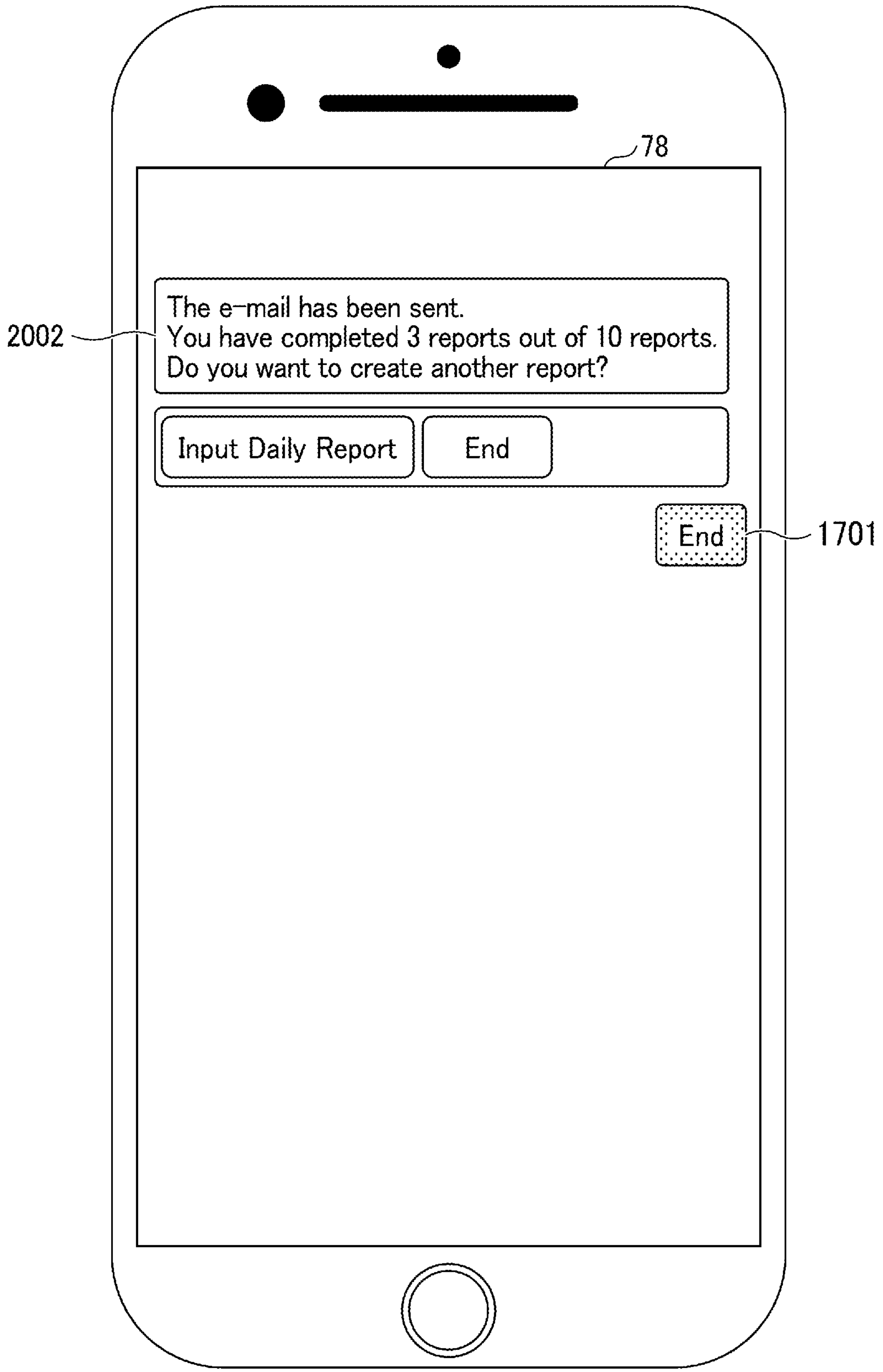
FIG. 14 is a diagram illustrating the eighth display screen of an information terminal according to one embodiment of the present disclosure.

Step S67: The generation unit 11 of the information processing apparatus 3 generates speech information that includes a question sentence for checking with the operator whether the operator has any report of another activity. At this point, the generation unit 11 may generate the speech information including the progress of the dialogue between the operator and the chatbot. The progress of the dialogue is, for example, information such as how many reports have been completed out of the total number of activities of the operator at the current time point. The communication unit 10 of the information processing apparatus 3 transmits the generated speech information to the communication unit 20 of the communication terminal 5. The display control unit 21 of the communication terminal 5 displays the speech information on the screen of the communication terminal 5. FIG. 13 is a diagram illustrating the seventh display screen of the information terminal 7 according to one embodiment of the present disclosure. In a speech 1601 on a display screen 77 illustrated in FIG. 13, the question sentence for checking with the operator whether the operator has any report of another activity and answer candidates to the question are presented. In a speech 1701, the answer ("End") selected by the operator from the answer candidates presented in the speech 1601 is presented as an answer to the question. FIG. 14 is a diagram illustrating the eighth display screen of the information terminal 7 according to one embodiment of the present disclosure. In a speech 2002 on a display screen 78 illustrated in FIG. 14, the progress of the dialogue, the question sentence for checking with the operator whether the operator has any report of another activity, and answer candidates to the question are presented. In the speech 2002, as the progress of the dialogue, it is presented that three out of ten reports of the activities of the operator have been completed. In the speech 1701, the answer ("End") selected by the operator from the answer candidates presented in the speech 2002 is presented as an answer to the question. Referring back to FIG. 6, the description continues.

Step S68: When the operator does not have any report of another activity, the generation unit 11 of the information processing apparatus 3 generates speech information that includes a greeting sentence of closing the dialogue for display to the operator. The communication unit 10 of the information processing apparatus 3 transmits the generated speech information to the communication unit 20 of the communication terminal 5. The display control unit 21 of the communication terminal 5 displays the speech information on the screen of the communication terminal 5.

The processing in the sequence chart illustrated in FIG. 6 has been described above.

Inference of Needs of Customer and Proposal Information to Customer

Figure 16:
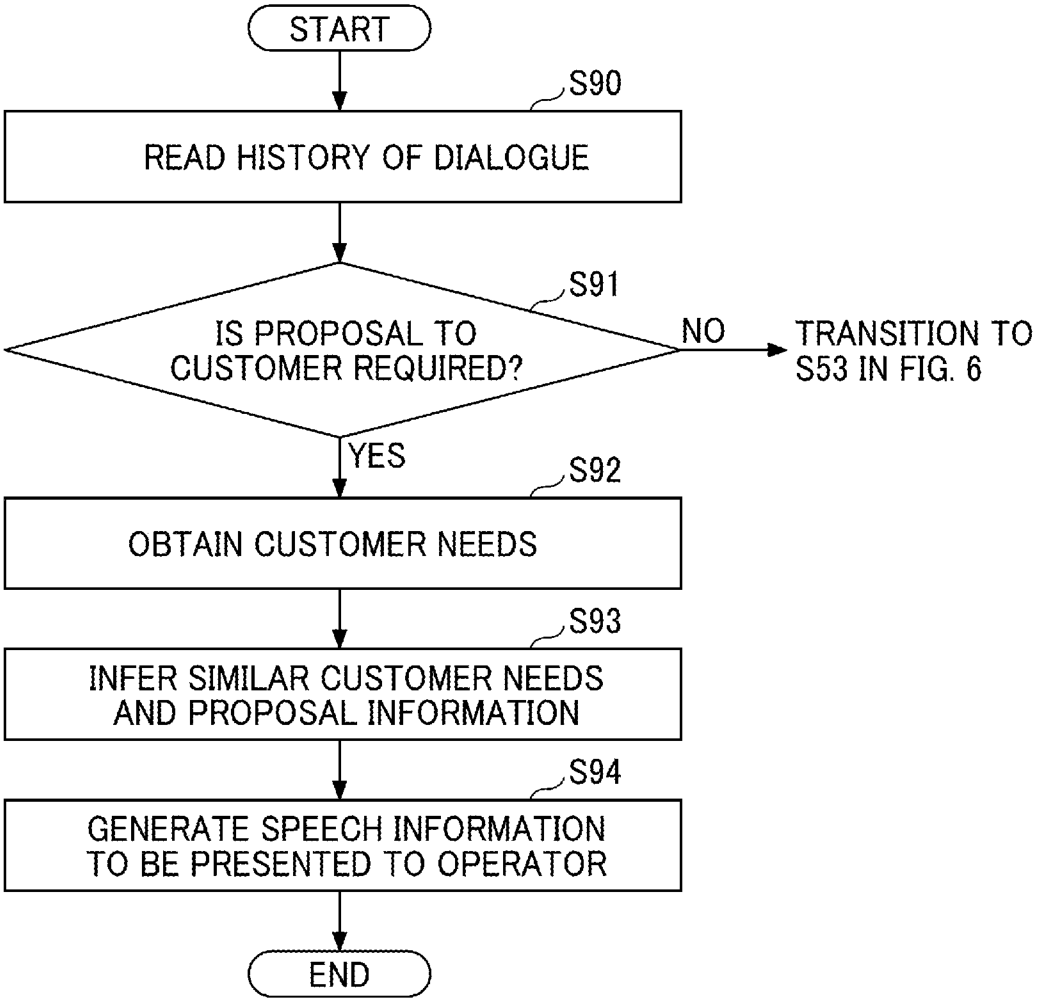
FIG. 16 is a flowchart of the processing to infer the needs of a customer and proposal information according to one embodiment of the present disclosure.

The method of inferring the needs of the customer in the processing of steps S57 to S58 of the sequence chart in FIG. 6 and the method of inferring the proposal information to the customer in the processing of steps S62 to S63 of the sequence chart in FIG. 6 are described in detail below. FIG. 16 is a flowchart of the processing to infer the needs of the customer and the proposal information according to one embodiment of the present disclosure. The steps in the processing illustrated in FIG. 16 are described below.

Step S90: The acquisition unit 12 of the information processing apparatus 3 reads the activity information acquired in the processing of step S55 of the sequence chart in FIG. 6 (for example, the activity information presented in the speech 1342 of FIG. 8) and the degree of progress of the activity determined in the processing of step S56 (for example, the degree of progress of the activity presented in the speech 1352 of FIG. 8).

Step S91: The determination unit 13 of the information processing apparatus 3 determines whether a proposal to the customer is required. For example, when the degree of progress of the activity is determined to be equal to or greater than a predetermined value based on the degree of progress of the activity acquired in the processing of step S90, the inference unit 14 determines that a proposal to the customer is required. When the determination unit 13 determines that a proposal to the customer is required, the control unit 15 of the information processing apparatus 3 advances the processing to step S92. When the determination unit 13 determines that a proposal to the customer is not required, the control unit 15 of the information processing apparatus 3 advances the processing to step S53 in FIG. 6 to ask questions about other business activities.

Step S92: The inference unit 14 of the information processing apparatus 3 obtains the needs of the customer from the activity information acquired in the processing of step S90. For example, the activity information is presented in the speech 1342 ("The customer requests an automatic storing system in preparation for AB issue. I will look into and propose next time.") of FIG. 8. In this case, "The customer requests an automatic storing system in preparation for AB issue." is obtained as the needs of the customer. Alternatively, the inference unit 14 may obtain, from the activity information, a character string (such as "automatic storing" or "system") with which the needs of the customer are searched for.

Still, alternatively, the inference unit 14 may obtain the needs of the customer from the activity information using a language model having been trained by using character strings on which sequence labeling is performed. In the present embodiment, the sequence labeling refers to assigning labels to individual words included in the teacher data by which the language model is trained. The labels indicate, for example, the first word in the expression of the needs of the customer, words in the expression, and words not in the expression. The language model is trained so as to predict the sequence labeling. Thus, when the needs of multiple customers are included in one sentence, the needs of each customer are obtained. In addition, words that are not relevant to the needs of the customer are excluded. The language model may be a language model created based on Bidirectional Encoder Representations from Transformers (BERT).

Step S93: The inference unit 14 of the information processing apparatus 3 infers the needs of other customers similar to the needs of the customer obtained in the processing of step S92, or proposal information for satisfying the needs of the customer (or for solving the issues of the customer). For example, the inference unit 14 obtains a sentence vector whose degree of similarity to the needs of the customer is higher than a predetermined threshold value using a language model that outputs a higher degree of similarity as the meaning is closer. Then, the inference unit 14 infers the sentence vector as the needs of another customer similar to the needs of the customer. The language model may be, for example, a language model that is trained such that the needs of other customers with similar meanings are vectorized close in distance, and the needs of customers with different meanings are vectorized far in distance. The language model may be a language model created based on sentence BERT that learns sentence vectors based on meaning as described above.

Alternatively, the inference unit 14 may infer proposal information for satisfying the needs of the customer by searching, for example, the Internet or databases, using the needs of other customers similar to the needs of the customer.

Step S94: The generation unit 11 of the information processing apparatus 3 generates speech information for display to the operator, including at least one of the needs of the customer obtained in the processing of step S92, the needs of other customers similar to the needs of the customer inferred in the processing of step S93, or the proposal information inferred in the processing of step S93. For example, the generation unit 11 generates the speech information by inserting the needs of the customer and the proposal information into predetermined positions of a template created in advance.

When the needs of the customer presented to the operator are modified by the operator in the processing of steps S59 and S60 of FIG. 6, the language model used in the processing of steps S92 and S93 in FIG. 16 may be trained again based on the modified needs of the customer. The processing in the sequence chart illustrated in FIG. 16 has been described above.

Another Display Screen of Communication Terminal (Information Terminal)

Figure 17:
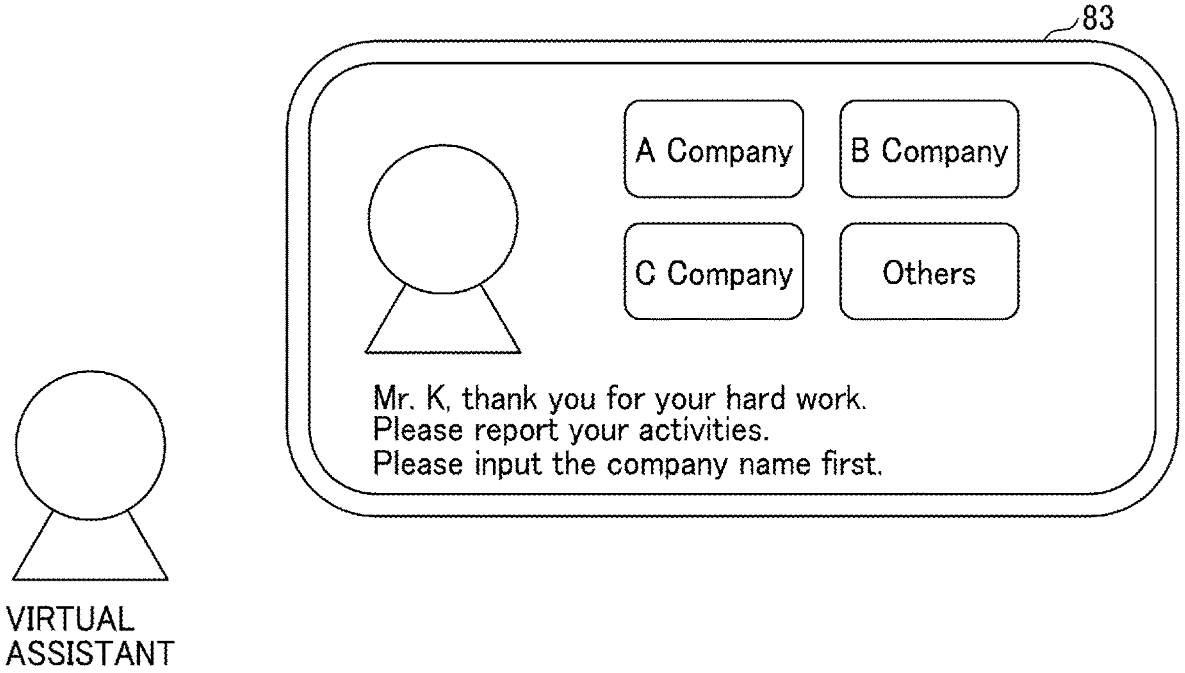
FIG. 17 is a diagram illustrating another display screen of an information terminal according to an alternative embodiment of the present disclosure.

Another display screen of the communication terminal 5 (or the information terminal 7) operated by the operator illustrated in FIGS. 7 to 12 is described below. FIG. 17 is a diagram illustrating another display screen of the information terminal 7 according to an alternative embodiment of the present disclosure. On a display screen 83 illustrated in FIG. 17, a person (virtual assistant) is presented on the left side of the screen, speech information for display to the operator is presented on the lower side of the screen, and answer candidates to a question to the operator are presented on the right side of the screen. The speech information is output by the speaker of the communication terminal 5, and a speech made by the operator using voice is input to the communication terminal 5. As described above, a user interface in which the operator communicates with the virtual assistant via the display screen 83 may be used. Further, the user interface may be a three-dimensional (3D) virtual space or a metaverse-type user interface in which the operator himself is presented as an avatar on the screen.

Through the processing described above, the information input support system 1 infers the issues and the needs that the customer of the operator has, and presents the information to be proposed to the customer to the operator. As a result, the creation of ideas in sales activities of the operator is promoted and the quality of sales reports is increased. In addition, through the dialogue with the operator, the information input support system 1 acquires information needed for creating a sales report, checks with the operator whether the contents of the sales report are correct, and presents the progress of the dialogue, in a routine manner in accordance with a predetermined sequence of the dialogue. As a result, effects such as reduction of the burden on the operator who creates the sales report, stabilization of the contents and the quality of the sales report that varies depending on the operator, and reduction of the time in creating the sales report are obtained.

According to the present embodiment, the determination of the degree of progress of the activity in the processing of step S56 in FIG. 6, the inference of the needs of the customer in the processing of steps S57 to S58, and the inference of the proposal information to the customer in the processing of steps S62 to S63 are executed by the external module 40. The external module 40 that executes the above-described processing may be provided outside the information processing apparatus 3, or may be included in the determination unit 13 or the inference unit 14 of the information processing apparatus 3.

While some embodiments of the present disclosure have been described, the present disclosure is not limited to such embodiments and may be modified and substituted in various ways without departing from the spirit of the present disclosure.

For example, the functional configuration according to the present embodiment illustrated in FIG. 4 is divided according to functions in order to facilitate understanding of the processing executed by the information input support system 1 and the information processing apparatus 3. No limitation to the scope of the present disclosure is intended by how the processing units are divided or by the names of the processing units. The processing units executed by the information input support system 1 and the information processing apparatus 3 may be divided into a greater number of processing units in accordance with the contents of the processing units. In addition, a single processing unit can be divided to include a greater number of processing units.

Each of the functions described above in the embodiments of the present disclosure may be implemented by one processing circuit or a plurality of processing circuits. The "processing circuit or circuitry" herein includes a programmed processor to execute functions by software, such as a processor implemented by an electronic circuit, and devices, such as an application specific integrated circuit (ASIC), a digital signal processor (DSP), a field programmable gate array (FPGA), and circuit modules known in the art arranged to perform the recited functions.

The group of apparatuses or devices described in the above-described embodiments of the present disclosure are merely one example of a plurality of computing environments that implement embodiments of the present disclosure. In some alternative embodiments of the present disclosure, each of the information input support system 1 and the information processing apparatus 3 includes a plurality of computing devices such as server clusters. The computing devices communicate one another through any type of communication link including, for example, a network or a shared memory, and perform the operations disclosed herein.

Aspects of the present disclosure are, for example, as follows.

Aspect 1

An information input support system includes a communication terminal operated by an operator and an information processing apparatus that communicates with the communication terminal. The information processing apparatus includes an acquisition unit, an inference unit, and a communication unit. The acquisition unit acquires information on the operator and activity information that includes information on an activity of the operator for a customer through a dialogue with the operator. The inference unit determines needs of the customer based on the activity information. The communication unit transmits speech information that includes the needs of the customer to the communication terminal for display to the operator. The communication terminal includes a display control unit that displays the speech information.

Aspect 2

In the information input support system according to Aspect 1, the activity information includes information on at least one of a company name of the customer, names of persons of the customer, a business meeting between the operator and the customer, or participants in the business meeting.

Aspect 3

In the information input support system according to Aspect 1 or 2, the inference unit determines proposal information to be proposed to the customer based on the needs of the customer, and the communication unit transmits the speech information including the proposal information to the communication terminal.

Aspect 4

The information input support system according to any one of Aspects 1 to 3 further includes a determination unit. The determination unit determines a degree of progress of the activity based on the activity information.

Aspect 5

The information input support system according to Aspect 4 further includes a control unit. The control unit controls the dialogue so as to check with the operator whether the activity information, the degree of progress of the activity, and the needs of the customer are correct.

Aspect 6

In the information input support system according to any one of Aspects 1 to 5, the communication unit transmits the speech information including the needs of the customer input by the operator, the degree of progress of the activity, and the progress of the dialogue to the communication terminal.

Aspect 7

The information input support system according to any one of Aspects 1 to 6 inputs a speech made by the operator using voice during the dialogue.

Aspect 8

In the information input support system according to any one of Aspects 1 to 7, the inference unit obtains the needs of the customer from the activity information using a language model having been trained by using character strings on which sequence labeling is performed.

Aspect 9

In the information input support system according to Aspect 3, the inference unit obtains information on a sentence vector whose degree of similarity to the needs of the customer is higher than a predetermined threshold value by using a language model that outputs a higher degree of similarity as the meaning is closer. Then, based on the information on the sentence vector, the inference unit determines needs of another customer similar to the needs of the customer or information for satisfying the needs of the customer as the proposal information.

Aspect 10

In the information input support system according to Aspect 8 or 9, the language model is trained again using the activity information, the degree of progress of the activity, and the needs of the customer that are modified by the operator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In one aspect, an information input support method executed by an information processing apparatus communicable with a communication terminal operated by an operator. The method includes acquiring information on the operator and activity information that includes information on an activity of the operator for a customer through a dialogue with the operator, determining needs of the customer based on the activity information, and transmitting speech information to the communication terminal. The speech information includes the needs of the customer for display to the operator.

The invention claimed is:

1. An information input support system comprising:

a communication terminal operated by an operator; and an information processing apparatus communicable with the communication terminal, the information processing apparatus including circuitry configured to:

acquire information on the operator and activity information that includes information on an activity of the operator for a customer through a dialogue with the operator;

determine a degree of progress of the activity based on the activity information;

determine whether or not a proposal to the customer is required based on the degree of progress of the activity:

in response to determining that the proposal is required, determine needs of the customer by using, as input information, the activity information and the determined degree of progress and transmit speech information to the communication terminal, the speech information including the needs of the customer for display to the operator, and in response to determining that the proposal is not required, transmit, to the communication terminal, a question sentence to ask a question to the operator and to acquire the activity information, and the communication terminal including another circuitry configured to output the speech information and the question sentence.

2. The information input support system according to claim 1, wherein the activity information includes information on at least one of a company name of the customer, names of persons of the customer, a business meeting between the operator and the customer, or participants in the business meeting.

3. The information input support system according to claim 1, wherein the circuitry is configured to:

determine proposal information to be proposed to the customer based on the needs of the customer; and transmit the speech information including the proposal information to the communication terminal.

4. The information input support system according to claim 1, wherein the circuitry is further configured to control the dialogue so as to check with the operator whether the activity information, the degree of progress of the activity, and the needs of the customer are correct.

5. The information input support system according to claim 1, wherein the circuitry is configured to transmit the speech information including the needs of the customer input by the operator, the degree of progress of the activity, and a progress of the dialogue to the communication terminal.

6. The information input support system according to claim 1, wherein the circuitry inputs a speech made by the operator using voice during the dialogue.

7. The information input support system according to claim 1, wherein the circuitry is configured to obtain the needs of the customer from the activity information using a language model having been trained by using character strings on which sequence labeling is performed.

8. The information input support system according to claim 3, wherein the circuitry is configured to determine needs of another customer similar to the needs of the customer or information for satisfying the needs of the customer as the proposal information based on information on a sentence vector whose degree of similarity to the needs of the customer is higher than a threshold value, the vector sentence being obtained by using a language model, the language model outputting a higher degree of similarity as meaning is closer.

9. The information input support system according to claim 7, wherein the language model is trained again using the needs of the customer modified by the operator.

10. An information processing apparatus communicable with a communication terminal operated by an operator, the information processing apparatus comprising circuitry configured to:

acquire information on the operator and activity information that includes information on an activity of the operator for a customer through a dialogue with the operator;

determine a degree of progress of the activity based on the activity information;

determine whether or not a proposal to the customer is required based on the degree of progress of the activity:

in response to determining that the proposal is required, determine needs of the customer by using, as input information, the activity information and the determined degree of progress and transmit speech information to the communication terminal, the speech information including the needs of the customer for display to the operator, and in response to determining that the proposal is not required, transmit, to the communication terminal, a question sentence to ask a question to the operator and to acquire the activity information.

11. A non-transitory recording medium storing a plurality of program codes which, when executed by one or more processors, causes the one or more processors to perform a method, the method comprising:

acquiring information on an operator and activity information that includes information on an activity of the operator for a customer through a dialogue with the operator;

determining a degree of progress of the activity based on the activity information;

determining whether or not a proposal to the customer is required based on the degree of progress of the activity;

in response to determining that the proposal is required, determining needs of the customer by using, as input information, the activity information and the determined degree of progress and transmitting speech information to a communication terminal, the speech information including the needs of the customer for display to the operator, and in response to determining that the proposal is not required, transmitting, to the communication terminal, a question sentence to ask a question to the operator to acquire the activity information.

* * * * *